US011191037B2

(12) United States Patent
Balasubramanian et al.

(10) Patent No.: US 11,191,037 B2
(45) Date of Patent: Nov. 30, 2021

(54) ALTITUDE PATH-LOSS BASED POWER CONTROL FOR AERIAL VEHICLES

(71) Applicant: InterDigital Patent Holdings, Inc., Wilmington, DE (US)

(72) Inventors: Anantharaman Balasubramanian, San Diego, CA (US); Ravikumar V. Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/494,394

(22) PCT Filed: Mar. 16, 2018

(86) PCT No.: PCT/US2018/022939
§ 371 (c)(1),
(2) Date: Sep. 16, 2019

(87) PCT Pub. No.: WO2018/175252
PCT Pub. Date: Sep. 27, 2018

(65) Prior Publication Data
US 2020/0100187 A1    Mar. 26, 2020

Related U.S. Application Data

(60) Provisional application No. 62/475,640, filed on Mar. 23, 2017.

(51) Int. Cl.
*H04W 52/24*            (2009.01)
*B64C 39/02*            (2006.01)
(Continued)

(52) U.S. Cl.
CPC ......... *H04W 52/242* (2013.01); *B64C 39/024* (2013.01); *H04W 52/143* (2013.01);
(Continued)

(58) Field of Classification Search
None
See application file for complete search history.

(56) References Cited

U.S. PATENT DOCUMENTS 5,410,736 A * 4/1995 Hoque ................. H04B 17/391
                                                    455/423
6,289,203 B1 * 9/2001 Smith ................... H04W 16/18
                                                    455/423
(Continued)

OTHER PUBLICATIONS

International Search Report and Written Opinion of the International Searching Authority for PCT/US2018/022939 dated Jun. 28, 2018.
(Continued)

*Primary Examiner* — Christopher M Crutchfield
(74) *Attorney, Agent, or Firm* — Invention Mine LLC

(57) ABSTRACT

Systems, methods, and instrumentalities are disclosed for power control for aerial wireless transmit receive units (WTRUs). Power control may be open loop and may be managed based on altitude. Open loop power control may be based partly on path loss estimation from neighboring cells and may be coordinated among interfering neighboring eNBs using path loss information. Dynamic power control may be driven by the WTRU. Reference signal transmissions by an eNB may use uplink resources for path loss estimation, and interference estimation may be based on uplink reference signals. Path loss estimation may be based on downlink reference signals. Dynamic blanking may be provided for Cell-specific Reference Signals (CRS), and random access (e.g. RACH) may be provided for aerial WTRUs.

19 Claims, 13 Drawing Sheets

(51) Int. Cl.
 *H04W 52/14* (2009.01)
 *H04W 52/32* (2009.01)
(52) U.S. Cl.
 CPC ....... *H04W 52/241* (2013.01); *H04W 52/248* (2013.01); *H04W 52/325* (2013.01); *B64C 2201/122* (2013.01)

(56) References Cited

U.S. PATENT DOCUMENTS

| | | | | |
|---|---|---|---|---|
| 9,516,608 | B2* | 12/2016 | Seo | H04W 52/242 |
| 9,955,307 | B1* | 4/2018 | Madine | H04W 4/33 |
| 2006/0072505 | A1* | 4/2006 | Carrillo | H04L 41/046 |
| | | | | 370/331 |
| 2006/0262731 | A1* | 11/2006 | Carlson | H04W 84/042 |
| | | | | 370/252 |
| 2010/0210255 | A1* | 8/2010 | Amirijoo | H04W 74/002 |
| | | | | 455/419 |
| 2012/0213092 | A1* | 8/2012 | Sun | H04W 52/40 |
| | | | | 370/248 |
| 2012/0213149 | A1* | 8/2012 | Chakraborty | H04W 52/365 |
| | | | | 370/328 |
| 2012/0235864 | A1* | 9/2012 | Lu | G01S 5/0242 |
| | | | | 342/451 |
| 2013/0176874 | A1* | 7/2013 | Xu | H04W 52/242 |
| | | | | 370/252 |
| 2013/0208675 | A1* | 8/2013 | Shen | H04W 52/367 |
| | | | | 370/329 |
| 2013/0244715 | A1* | 9/2013 | Kwon | H04W 52/242 |
| | | | | 455/522 |
| 2013/0310077 | A1* | 11/2013 | Siomina | H04W 4/029 |
| | | | | 455/456.2 |
| 2013/0324145 | A1* | 12/2013 | Tabet | H04L 1/0027 |
| | | | | 455/452.2 |
| 2014/0295873 | A1* | 10/2014 | Lunden | H04W 52/38 |
| | | | | 455/454 |
| 2014/0378177 | A1* | 12/2014 | Muraoka | H04B 17/21 |
| | | | | 455/501 |
| 2016/0150445 | A1* | 5/2016 | Sandhu | H04W 36/0094 |
| | | | | 370/331 |
| 2016/0150484 | A1* | 5/2016 | Seo | H04W 52/322 |
| | | | | 455/522 |
| 2016/0198455 | A1* | 7/2016 | Caretti | H04W 72/042 |
| | | | | 370/329 |
| 2017/0078984 | A1* | 3/2017 | Uemura | H04W 52/365 |
| 2017/0126309 | A1* | 5/2017 | Rupasinghe | H04B 7/0617 |
| 2017/0171761 | A1* | 6/2017 | Guvenc | H04W 36/32 |
| 2017/0211933 | A1* | 7/2017 | Babel | G01C 5/06 |
| 2017/0251414 | A1* | 8/2017 | Ghazi-Moghadam | |
| | | | | H04W 36/0083 |
| 2017/0290008 | A1* | 10/2017 | Tooher | H04L 1/1896 |
| 2017/0295069 | A1* | 10/2017 | Sweet, III | B64C 39/024 |
| 2017/0325221 | A1* | 11/2017 | Jalali | H04B 7/18504 |
| 2018/0014257 | A1* | 1/2018 | Ouchi | H04W 52/242 |
| 2018/0063801 | A1* | 3/2018 | Lu | H04W 74/0833 |
| 2019/0041488 | A1* | 2/2019 | Ivanov | H04W 4/33 |
| 2019/0086938 | A1* | 3/2019 | Shattil | G05D 1/0088 |
| 2019/0113912 | A1* | 4/2019 | Olson | G08C 17/02 |
| 2020/0084735 | A1* | 3/2020 | Cheng | H04W 52/146 |
| 2020/0187213 | A1* | 6/2020 | Yun | H04W 72/082 |
| 2020/0214073 | A1* | 7/2020 | Shimoda | H04W 16/32 |
| 2020/0245372 | A1* | 7/2020 | Lei | H04L 25/067 |

OTHER PUBLICATIONS

Qualcomm, "Leading the World to 5G: Evolving Cellular Technologies for Safer Drone Operations". Qualcomm Report, Sep. 2016, 31 pages.
Third Generation Partnership Project, "3rd Generation Partnership Project; Technical Specification Group Radio Access Network; Study on channel model for frequency spectrum above 6 GHz". 3GPP TR 38.900, Release 14, V14.2.0, Dec. 2016.
NTT Docomo Inc., "Study on E-UTRA and E-UTRAN Enhancements for Aerial Vehicles". Third Generation Partnership Project, 3GPP TSG RAN Meeting # 75, RP-170156, Mar. 6-9, 2017, 5 pages.
NTT Docomo, Inc., "Potential Challenges for Emerging Drone Services". Third Generation Partnership Project, 3GPP TSG RAN WG#2, R2-1701077, Feb. 13-17, 2017, pp. 1-4.
Huawei, "Discussion on the Power Ramping for PRACH Coverage Enhancement". Third Generation Partnership Project, 3GPP TSG RAN WG1 Meeting #80, R1-150397, Feb. 9-13, 2015, pp. 1-4.
Huawei, "On Transmit Power and Power Ramping for PRACH in Coverage Enhancement". Third Generation Partnership Project, 3GPP TSG RAN WG1 Meeting #81, R1-152456, May 2015, pp. 1-4.
Third Generation Partnership Project, "3rd Generation Partnership Project; Technical Specification Group Radio Access Network; Evolved Universal Terrestrial Radio Access (E-UTRA); Physical Channels and Modulation". 3GPP TS 36.211, Release 14, Dec. 2016, pp. 1-175.
NTT Docomo Inc., "Study on enhanced Support for Aerial Vehicles". Third Generation Partnership Project, 3GPP TSG RAN Meeting #75, RP-170779, Mar. 6-9, 2017, 4 pages.
Third Generation Partnership Project, "Technical Specification Group Radio Access Network; Network-Assisted Interference Cancellation and Suppression for LTE". 3GPP TR 36.866, V1.1.0, Nov. 2013, uploaded Dec. 16, 2013, 59 pages.
Ghosh, A., et. al, "Fundamentals of LTE". Prentice Hall, 2011.
International Preliminary Report on Patentability for PCT/US2018/022939 dated Sep. 24, 2019, 8 pages.
Dahlman, E., et al., "4G: LTE/LTE-Advanced for Mobile Broadband". Academic press, Elsevier Publications, Second Edition, 2013 (538 pages).
Please see accompanying remarks, dated Sep. 8, 2021, filed herewith. As noted in remarks, pp. 285-288 reviewed in detail.

* cited by examiner

ALTITUDE PATH-LOSS BASED POWER CONTROL FOR AERIAL VEHICLES

CROSS-REFERENCE TO RELATED APPLICATIONS

The present application is a national stage application under 35 U.S.C. § 371 of International Application No. PCT/US2018/022939, entitled "ALTITUDE PATH-LOSS BASED POWER CONTROL FOR AERIAL VEHICLES", filed on Mar. 16, 2018, which claims benefit under 35 U.S.C. § 119(e) from U.S. Provisional Patent Application Serial No. 62/475,640, filed Mar. 23, 2017, entitled "Power Control for Aerial Vehicles," which is incorporated herein by reference in its entirety.

BACKGROUND

Mobile communications continue to evolve; a fifth generation mobile communication system may be referred to as 5G. A previous (legacy) generation of mobile communication may be, for example, fourth generation (4G) long term evolution (LTE). Mobile wireless communications implement a variety of radio access technologies (RATs), such as New Radio (NR) or 5G flexible RAT. Use cases for NR may include, for example, extreme Mobile Broadband (eMBB), Ultra High Reliability and Low Latency Communications (URLLC) and massive Machine Type Communications (mMTC).

SUMMARY

Systems, methods, and instrumentalities are disclosed for power control for aerial vehicles. Power control may be open loop and may be managed based on altitude. Open loop power control may be based on, for example, path loss estimation from neighboring cells. Power control may be coordinated among interfering neighboring evolved Node Bs (eNBs) using path loss information. Dynamic power control may be driven by a wireless transmit/receive unit (WTRU). Reference signal transmissions by an eNB may use uplink resources for path loss estimation, and interference estimation may be based on uplink reference signals. Path loss estimation may be based on downlink reference signals, and dynamic blanking may be provided for Cell-specific Reference Signals (CRS). Random access (e.g. RACH) may be provided for unmanned aerial vehicle (UAVs, a.k.a. drones).

A method of power control for an aerial WTRU may comprise estimating a path loss from a serving cell; determining a path loss compensation factor, wherein the path loss compensation factor is dependent on an altitude of the WTRU; and setting an uplink transmission power based on the estimated path loss and the path loss compensation factor. The path loss compensation factor may be lower with higher altitude, and determining a path loss compensation factor may comprise estimating a path loss from at least one neighboring cell. Estimating a path loss comprises using measurements of a reference signal power, wherein the reference signal is a downlink reference signal. The method may further comprise dynamically blanking CRSs or reporting, by the aerial WTRU to the serving call, a cell-id of a neighboring cell and a path loss from the neighboring cell. The method may additionally comprise reporting, by the serving cell to the neighboring cell, the path loss from the neighboring cell, possibly through a backhaul connection. Alternatively, the method may comprise the aerial WTRU reporting, to the neighboring cell, path loss information from the neighboring cell. The power control may be for a RACH, and the method may comprise transmitting a concatenated Zadoff-Chu (ZC) sequence over the RACH. The serving cell may comprise an evolved Node B (eNB). The aerial WTRU may include an unmanned aerial vehicle (UAV). The UAV may be a drone.

A method of providing altitude-based open loop power control for an aerial WTRU in communication with a terrestrial-based wireless communication system that also communicates with terrestrial WTRUs may comprise estimating a path loss for a serving cell along a first communication path between the serving cell and the aerial WTRU; estimating a path loss for a neighboring cell along a second communication path between the neighboring cell and the aerial WTRU, wherein the neighboring cell is different from the serving cell; determining a path loss compensation factor, wherein the path loss compensation factor is dependent on an altitude of the WTRU; and controlling transmission power for the aerial WTRU based on the path loss estimation for the serving cell, the path loss estimation for the neighboring cell, and the path loss compensation factor. A system for providing altitude-based open loop power control for an aerial WTRU may comprise a receiver; a transmitter; a processor; and a non-transitory computer-readable medium storing instructions that are operative, when executed by the processor, to perform a method described herein.

BRIEF DESCRIPTION OF THE DRAWINGS

A more detailed understanding may be had from the following description, presented by way of example in conjunction with the accompanying drawings. Furthermore, like reference numerals in the figures indicate like elements.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum in the detailed description of the drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Example Networks for Implementation of the Embodiments

Figure 1:
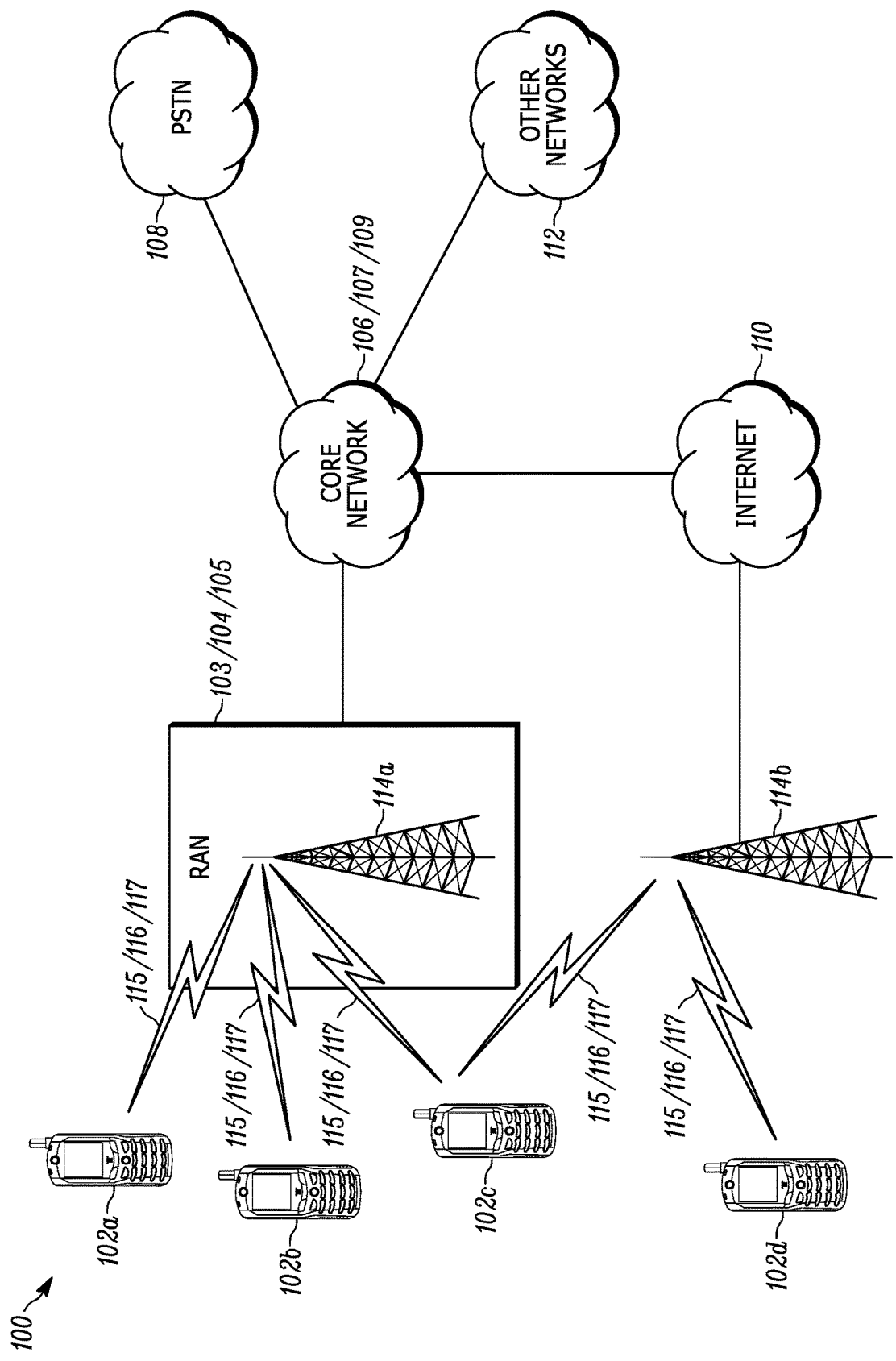
FIG. 1 is a system diagram of an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. Exemplary communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1, the communications system 100 may include wireless transmit/receive units (WTRUs) 102a, 102b, 102c, 102d, a radio access network (RAN) 103/104/105, a core network (CN) 106/107/109, a public switched telephone network (PSTN) 108, the interneb 110, and other networks 112, although it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b,102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c,102d to facilitate access to one or more communication networks, such as the CN 106/107/109, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in some embodiments, the base station 114a may include three transceivers, i.e., one for each sector of the cell. In some embodiments, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 115/116/117, which may be any suitable wireless communication link (e.g., radio frequency (RF), microwave, centimeter wave, micrometer wave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In some embodiments, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro). In some embodiments, the base station 114a and the WTRUs 102a, 102b, 102c may implement a radio technology such as NR Radio Access , which may establish the air interface 115/116/117 using New Radio (NR).

In some embodiments, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a evolved Node B and a gNB).

In some embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1 X, CDMA2000 EV-DO, Interim Standard 2000 (IS-2000 ), Interim Standard 95 (IS-95 ), Interim Standard 856 (IS-856 ), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In some embodiments, the base station 114b and the WTRUs 102c, 102d may implement a radio technology such as IEEE 802.11 to establish a wireless local area network (WLAN). In some embodiments, the base station 114b and the WTRUs 102c, 102d may implement a radio technology such as IEEE 802.15 to establish a wireless personal area network (WPAN). In yet other embodiments, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1, the base station 114b may have a direct connection to the Internet 110. Thus, the base station 114b may not be required to access the Internet 110 via the CN 106/107/109.

The RAN 103/104/105 may be in communication with the CN 106/107/109, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the CN 106/107/109 may be in direct or indirect communication with other RANs that employ the same RAT as the RAN 103/104/105 or a different RAT. For example, in addition to being connected to the RAN 103/104/105, which may be utilizing a NR radio technology, the CN 106/107/109 may also be in communication with another RAN (not shown) employing a GSM, UMTS, CDMA 2000, WiMAX, E-UTRA, or WiFi radio technology.

The CN 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology.

Figure 2:
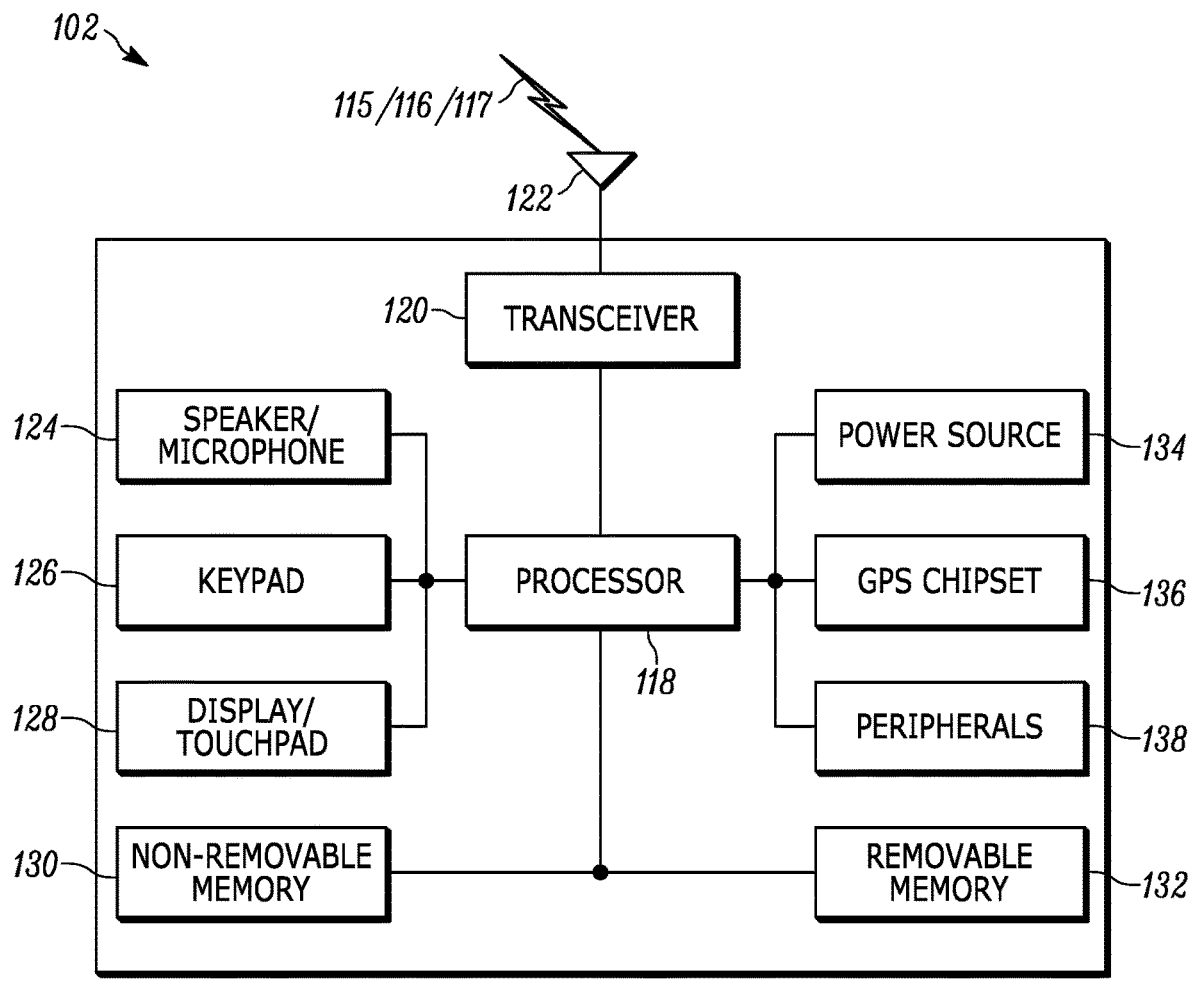
FIG. 2 is a system diagram of an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 2 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In some embodiments, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

In addition, although the transmit/receive element 122 is depicted in FIG. 2 as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR, UTRA, and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In some embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In some embodiments, the WRTU 102 may include a half-duplex radio for which transmission and reception of some or all of the signals (e.g., associated with particular subframes for either the UL (e.g., for transmission) or the downlink (e.g., for reception)).

Figure 3:
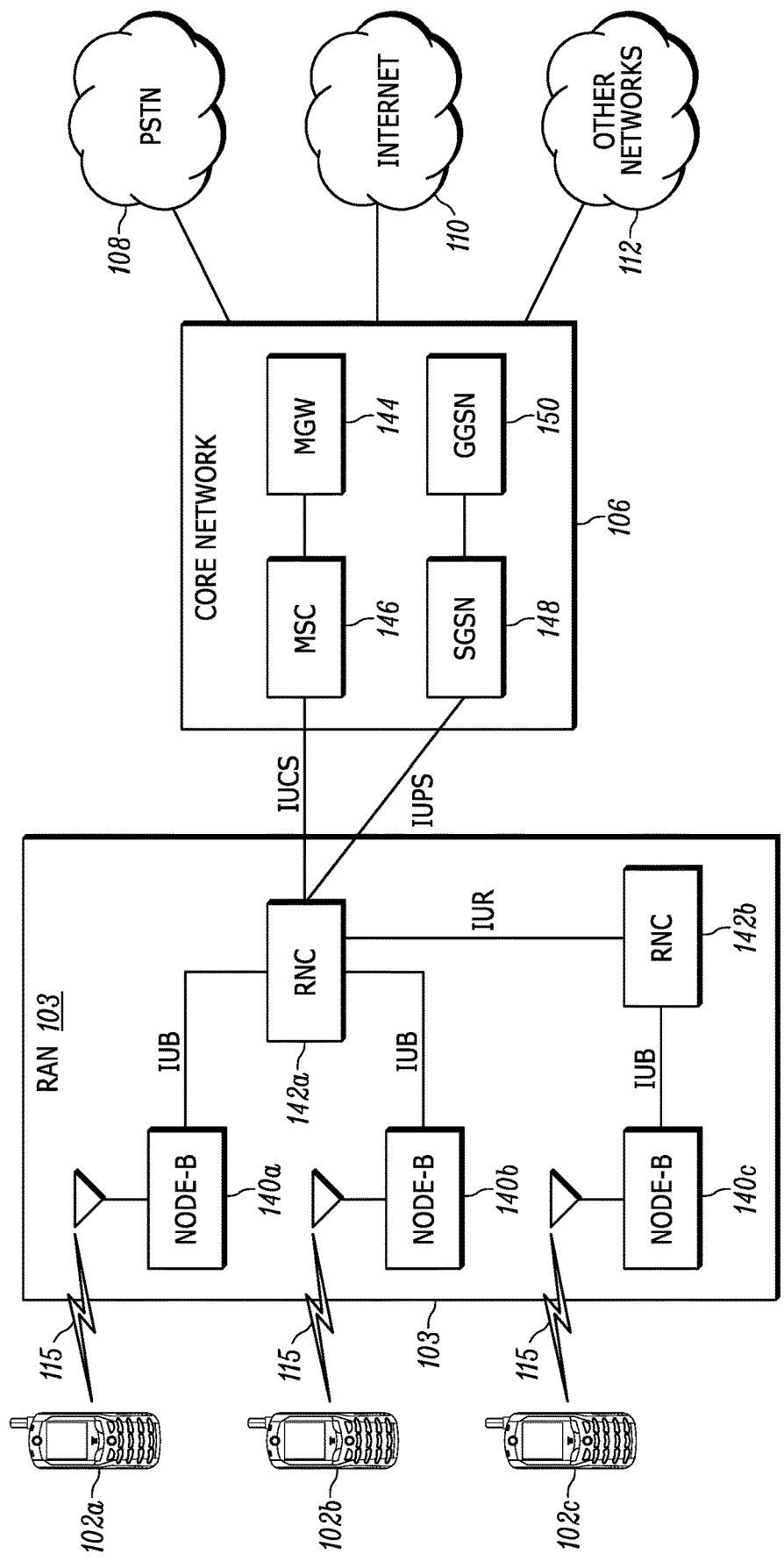
FIG. 3 is a system diagram of an example radio access network (RAN) and an example core (CN) network that may be used within the communications system illustrated in FIG. 1.

FIG. 3 is a system diagram of the RAN 103 and the CN 106 according to an embodiment. As noted above, the RAN 103 may employ a UTRA radio technology to communicate with the WTRUs 102a, 102b, 102c over the air interface 115. The RAN 103 may also be in communication with the CN 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The CN 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the CN 106, it will be appreciated that any one of these elements may be owned and/or operated by an entity other than the CN operator.

The RNC 142 a in the RAN 103 may be connected to the MSC 146 in the CN 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102 a, 102 b, 102 c and traditional land-line communications devices.

The RNC 142a in the RAN 103 may also be connected to the SGSN 148 in the CN 106 via an IuPS interface. The SGSN 148 may be connected to the GGSN 150. The SGSN 148 and the GGSN 150 may provide the WTRUs 102a, 102b, 102cwith access to packet-switched networks, such as the Internet 110, to facilitate communications between and the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

As noted above, the CN 106 may also be connected to the networks 112, hich may include other wired or wireless networks that are owned and/or operated by other service providers.

Figure 4:
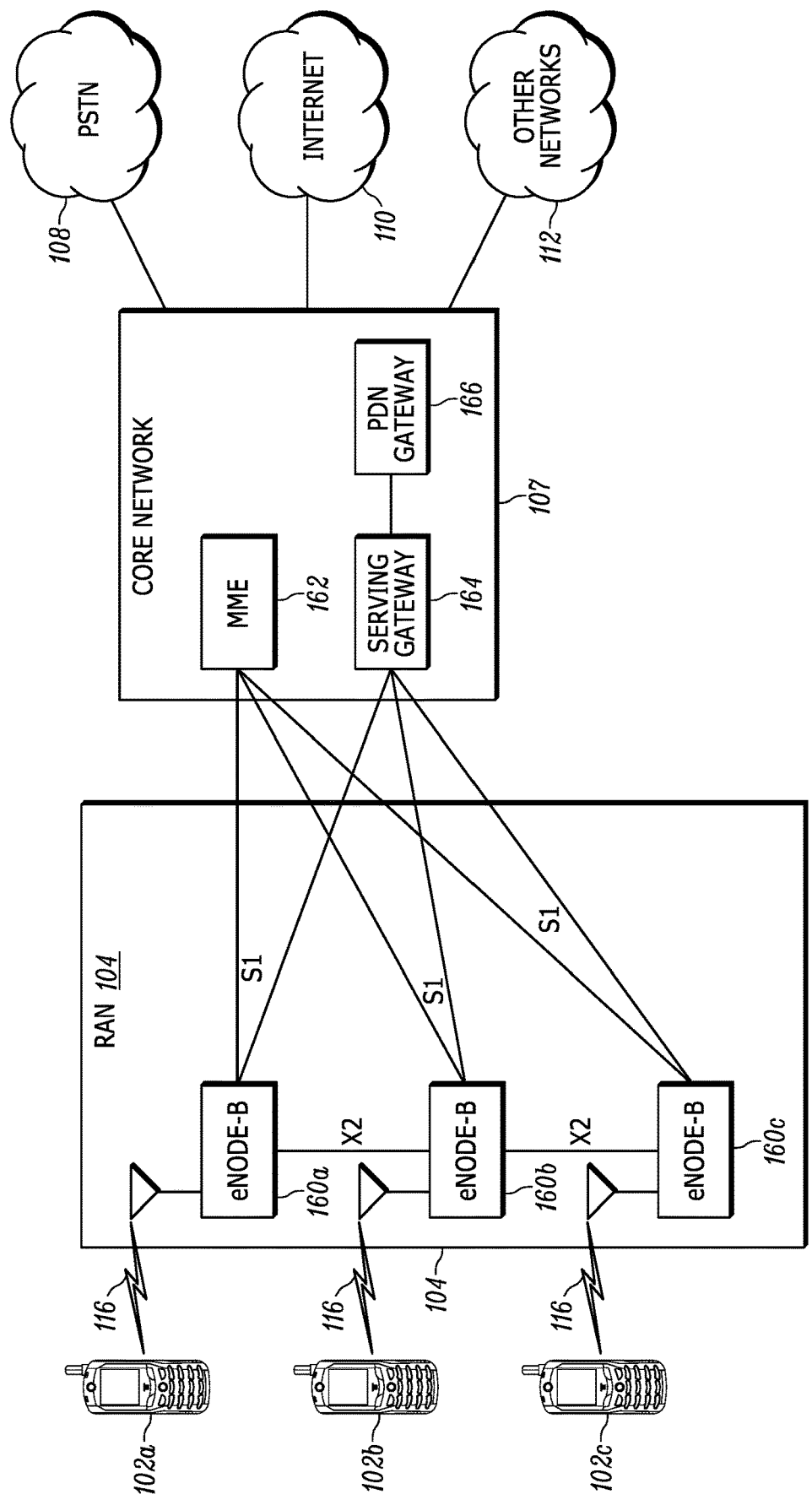
FIG. 4 is a system diagram of another example RAN and another example CN that may be used within the communications system illustrated in FIG. 1.

FIG. 4 is a system diagram of the RAN 104 and the CN 107 according to an embodiment. As noted above, the RAN 104 may employ an E-UTRA radio technology to communicate with the WTRUs 102a, 102b, 102c over the air interface 116. The RAN 104 may also be in communication with the CN 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160 c may implement MIMO technology. Thus, the eNode-B 160a, for example, may use multiple antennas to transmit wireless signals to, and receive wireless signals from, the WTRU 102a.

Each of the eNode-Bs 160 a, 160 b, 160 c may be associated with a particular cell (not shown) and may be configured to handle radio resource management decisions, handover decisions, scheduling of users in the uplink (UL) and/or downlink (DL), and the like. As shown in FIG. 4, the eNode-Bs 160a, 160b, 160c may communicate with one another over an X2 interface.

The CN 107 shown in FIG. 4 may include a mobility management gateway (MME) 162, a serving gateway (SGW) 164, and a packet data network (PDN) gateway 166. While each of the foregoing elements are depicted as part of the CN 107, it will be appreciated that any one of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular SGW during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 107 may facilitate communications with other networks. For example, the CN 107 may provide the WTRUs 102a, 102b, 102c with access to circuit-switched networks, such as the PSTN 108, to facilitate communications between the WTRUs 102a, 102b, 102c and traditional land-line communications devices. For example, the CN 107 may include, or may communicate with, an IP gateway (e.g., an IP multimedia subsystem (IMS) server) that serves as an interface between the CN 107 and the PSTN 108. In addition, the CN 107 may provide the WTRUs 102a, 102b, 102c with access to the networks 112, which may include other wired or wireless networks that are owned and/or operated by other service providers.

The RAN 104 may include eNode-Bs 160a, 160b, 160c, though it will be appreciated that the RAN 104 may include any number of eNode-Bs while remaining consistent with some embodiments. The eNode-Bs 160a, 160b, 160c may each include one or more transceivers for communicating with the WTRUs 102a, 102b, 102c over the air interface 115/116/117. In some embodiments, the eNode-Bs 160a, 160b, 160c may implement MIMO technology. Thus, the eNode-B 160 a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface.

The CN 107 shown in FIG. 4 may include a mobility management entity (MME) 162, a SGW 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 103 via an S1 interface and may serve as a control node. For example, the MME 162 may be responsible for authenticating users of the WTRUs 102*a*, 102*b*, 102*c*, bearer activation/deactivation, selecting a particular SGW during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 103 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

Figure 5:
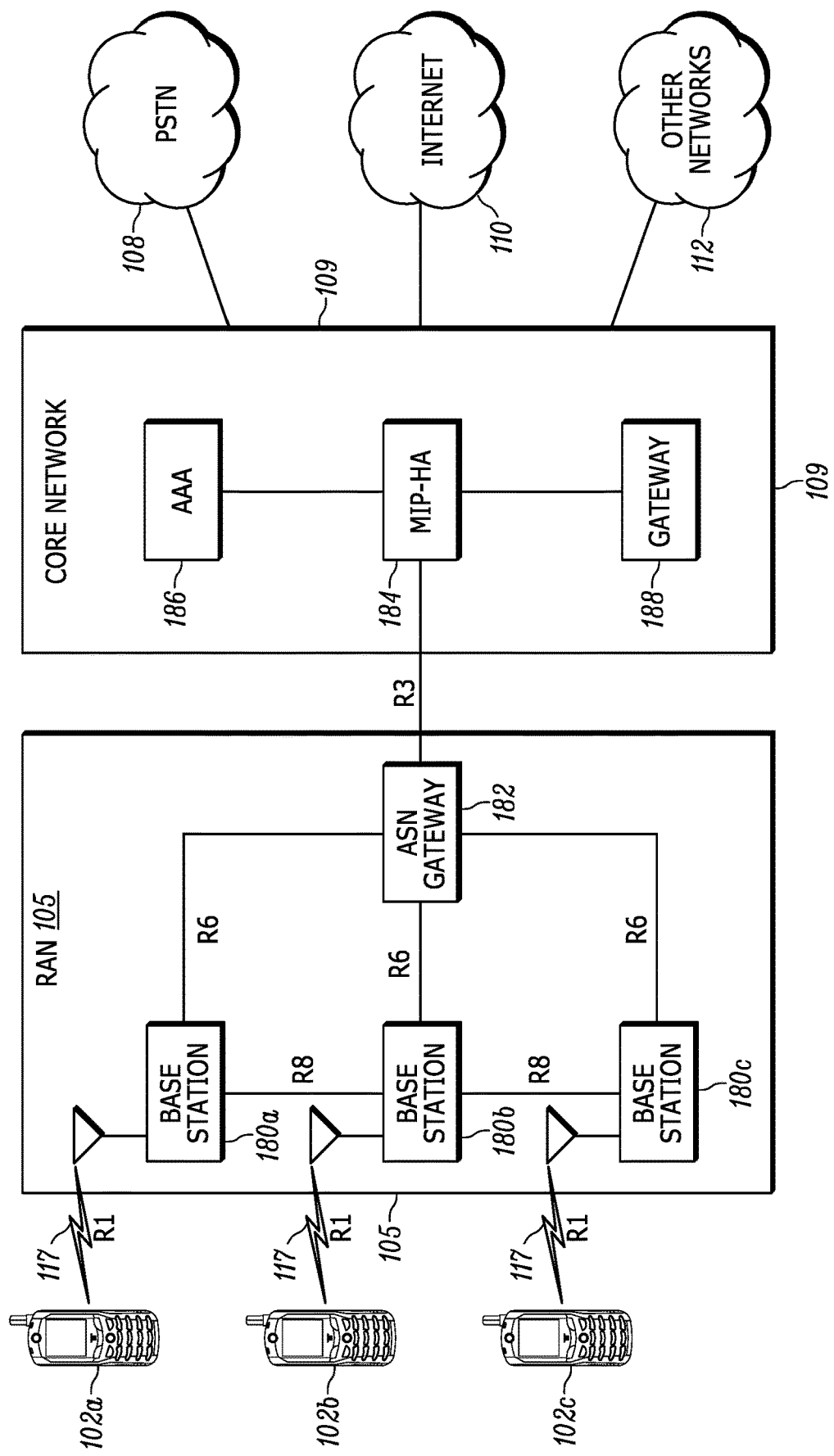
FIG. 5 is a system diagram of another example RAN and another example CN that may be used within the communications system illustrated in FIG. 1.

FIG. 5 is a system diagram of the RAN 105 and the CN 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the CN 109 may be defined as reference points.

As shown in FIG. 5, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In some embodiments, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the CN 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the CN 109. The logical interface between the WTRUs 102*a*, 102*b*, 102*c* and the CN 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 5, the RAN 105 may be connected to the CN 109. The communication link between the RAN 105 and the CN 109 may defined as an R3 reference point that includes protocols for facilitating data transfer and mobility management capabilities, for example. The CN 109 may include a mobile IP home agent (MIP-HA) 184, an authentication, authorization, accounting (AAA) server 186, and a gateway 188. While each of the foregoing elements are depicted as part of the CN 109, it will be appreciated that any one of these elements may be owned and/or operated by an entity other than the CN operator.

The MIP-HA may be responsible for IP address management, and may enable the WTRUs 102*a*, 102*b*, 102*c* to roam between different ASNs and/or different CNs. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 5, RAN 105 may be connected to other ASNs and the CN 109 may be connected to other CNs. The communication link between the RAN 105 the other ASNs may be defined as an R4 reference point, which may include protocols for coordinating the mobility of the WTRUs 102a, 102b, 102*c* between the RAN 105 and the other ASNs. The communication link between the CN 109 and the other CNs may be defined as an R5 reference, which may include protocols for facilitating interworking between home CNs and visited CNs.

Although the WTRU is described in FIGS. 1 through 5 as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 Hz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

In view of FIGS. 1 through 5, and the corresponding descriptions, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Aerial Vehicle Power Control.

Systems, methods, and instrumentalities are disclosed for power control for aerial vehicles. Power control may be open loop in some embodiments, and may be managed based on altitude in some embodiments. Open loop power control may be based on, for example, path loss estimation from neighboring cells. Power control may be coordinated among interfering neighboring evolved Node Bs (eNBs) using path loss information. Dynamic power control may be WTRU-driven. Reference signal transmissions by an eNB may use uplink resources for path loss estimation. Interference estimation may be based on uplink reference signals, in some embodiments. Path loss estimation may be based on downlink reference signals. Dynamic blanking may be provided for Cell-specific Reference Signals (CRS). Random access (e.g. RACH) may be provided for UAVs, in some embodiments.

Unmanned Aerial Vehicles (UAVs) may represent a deeply disruptive technology with massive implications across industries. More generally, a UAV is an example of an aerial WTRU (versus a terrestrial WTRU). A drone revolution is poised to reshape economic, social, security, environmental, political and legal landscapes. The civilian market for UAVs is growing faster than the military market. The global commercial UAV market is expanding in the fields of construction, agriculture, energy, utilities, insurance, mining, real estate, package delivery, news media, and film production. Significant increases in UAV technology investments in 2016 more than triple the combined total from 2010-2015. The FAA predicts that UAVs may comprise a $90 billion industry within a decade.

Cellular infrastructure may provide coverage to UAVs (e.g. at various altitudes and interference levels) in addition to terrestrial VVTRUs. UAVs may be integrated to coexist with cellular terrestrial users of communication systems. Differences in operational scenarios between UAVs and terrestrial users may include altitudes between 0 and 400 feet for UAVs and 0 and 50 feet for terrestrial users. A communication system architecture designed predominantly for terrestrial users may be adapted to UAVs. Channel models have been developed for terrestrial systems and communication protocols have been designed based on terrestrial channel models.

Propagation environments can be different for unmanned aerial vehicles (UAVs) and terrestrial UEs. A channel environment at 400-feet altitude may be different from a terrestrial user environment. A channel environment at high altitudes (e.g. higher than 150 feet) may experience a strong line of sight (LOS) component while lower altitudes (e.g. less than 50 feet) may experience multi-path characteristics, e.g., similar to a terrestrial VVTRU experience. Mid-range altitudes (e.g. between 50 and 150 feet) may have both LOS and multi-path characteristics. Channels may be modeled at different altitudes for terrestrial communication system adaptation.

Table 1 provides results of an example test scenario to ascertain the number of base stations that may be detected by a UAV with increasing altitude.

Figure 6:
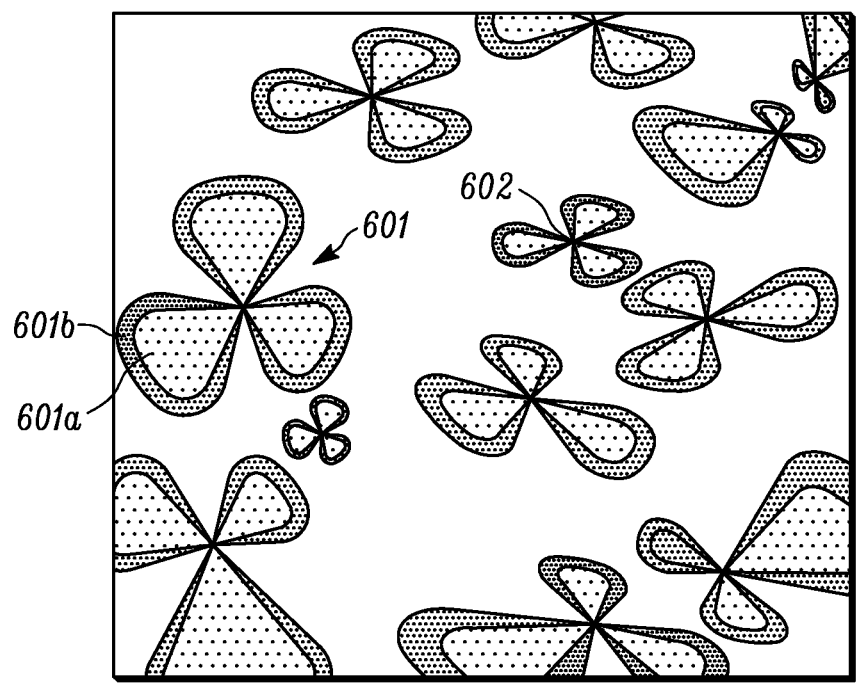
FIG. 6 is an example of simulation results for signal-to-interference-and-noise ratio (SINR) estimates for an unmanned aerial vehicle (UAV) in a multi-cell scenario.
Figure 7:
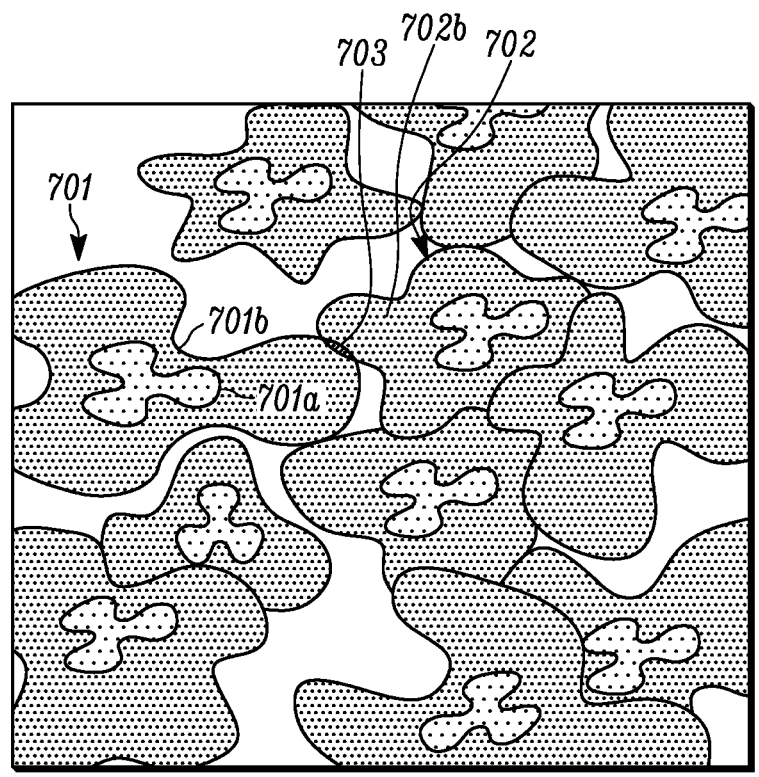
FIG. 7 is an example of simulation results for received power estimates for a UAV (drone) in a multi-cell scenario.

UAVs (drones) may have experience and cause more interference as a result of the visibility of a higher number of adjacent cells. This is illustrated in FIGS. 6 and 7. FIG. 6 is an exemplary simulation result for signal-to-interference-and-noise ratio (SINR) estimates for a UAV in a multi-cell scenario. FIG. 7 is an exemplary simulation result for received power estimates for a UAV in a multi-cell scenario.

FIG. 6 is a contour plot in decibels (dB), with contours drawn at approximately 6 dB and 0 dB. For example cell SINR pattern 601, which is from a particular cell tower, the 6 dB region is labeled as 601a and the 0 dB region is labeled as 601b. Thus, any UAV within region 601b should experience an SINR of 6 dB or higher. A nearby cell SINR pattern 602 is to the right. FIG. 7 is also a contour plot in dB, with contours drawn at −40 dB and −60 dB. For example cell power pattern 701, which is from a particular cell tower and corresponds to cell SINR pattern 601, the −40 dB region is labeled as 701a and the −60 dB region is labeled as 701b. For example cell power pattern 702, which is from a particular cell tower and corresponds to cell SINR pattern 602, the −60 dB region is labeled as 702b. As can be seen in FIG. 7, regions 701b and 702b overlap in overlap region 703. A UAV in overlap region 703 may observe notable interference in a downlink and may generate notable interference in an uplink. Higher interference levels may be detrimental to reliable command and control (C2) operation for UAVs, which can negatively affect market adoption.

Interference may limit UAV communications, for example, due to the LOS propagation environment UAVs may experience. Also UAV communications may impact terrestrial WTRUs. Interference may be managed in 3GPP networks, e.g., using interference suppression and interference cancellation. Interference suppression may be implemented, for example, by applying linear filtering on a received signal, for example, as opposed to explicitly cancelling interference by interference cancellation. Desired information and interference information may be jointly detected. Partial information about an interferer (e.g. MCS and or interferers' channel) may be known. For example of interference cancellation, an RNTI of an interferer may be available. Codeword cancellation may be performed to improve performance.

Interference management in wireless networks may involve power control. For example, power control may derive transmit power of a WTRU (e.g. for uplink transmission), for example, based on channel conditions. A WTRU may measure downlink path loss, for example, to get an estimate of path loss on an uplink, e.g., for use in determining transmit power. This may assume identical downlink and uplink path loss. There are several types of power control, e.g., open loop power control (e.g. a long time scale power control mechanism) and closed loop control (e.g. provides corrections to open loop control as and when necessary).

Open loop power control may compensate (fully or partly) a downlink path loss to derive uplink transmit power. Full path loss compensation may be provided for random-access channel (RACH) operations (and for users close to an eNB for data transmissions), for example, to maximize a first attempt access probability to the network. Partial path loss compensation may be referred to as fractional power control. In some embodiments, cell edge users may interfere with neighboring cells if the cell edge users fully compensate for downlink path loss, which may create more inter-

TABLE 1

| | Frequency Bands | | | | Neighbor Distance (miles) | | |
| --- | --- | --- | --- | --- | --- | --- | --- |
| Altitude (ft) | 700 MHz | 1700/2100 MHz | 1900 MHz | Total | 700 MHz | 1700/2100 MHz | 1900 MHz |
| 400 | 7 | 5 | 6 | 18 | 11.5 | 1.6 | 3.16 |
| 300 | 4 | 7 | 5 | 16 | 7.1 | 5 | 1.66 |
| 200 | 6 | 5 | 7 | 18 | 1.5 | 1.6 | 1.66 |
| 100 | 7 | 4 | 6 | 17 | 9.9 | 1.6 | 1 |
| Ground | 4 | 4 | 2 | 10 | 1.6 | 1.6 | 1 | ference. Path loss for cell edge users may be partially compensated, for example, to improve spectral efficiency of a cell.

A maximum transmit power for UAVs may be constrained, for example, compared to terrestrial WTRUs. This may reduce interference from UAVs (e.g. given LOS channel propagation compared to terrestrial WTRUs). Constraining transmission power may not make UAVs amenable to satellite access, which may require more, rather than less, transmission power. Power constraints may reduce target SINR, signal-to-interference ratio (SIR), and signal-to-noise ratio (SNR), which may reduce communication system reliability. Adapting a UAV's maximum transmit power, as opposed to limiting maximum transmit power to a fixed value, may improve performance.

UL reference signals may be used by an eNB to infer interference generated by UAVs. Measurement reporting may be triggered, for example, based on satisfying criterion for multiple cells (as opposed to a single cell) for UAVs. UAVs may see multiple cells. It may be wasteful of resources to trigger a measurement report every time a criterion may be satisfied for every cell.

Power control may be provided for RACH access. A RACH mechanism may have, for example, a set of six Physical Resource Blocks (PRBs) (a PRACH resource set) that may be provided by a cell for users to access a network. RACH (Random-Access Channel) is the transport-layer channel; the corresponding physical-layer channel is PRACH (Physical Random-Access Channel; random access preambles). A user may choose a preamble sequence (e.g. at random) and may use a designated PRACH resource set to transmit the preamble. An eNB may decode the preamble sequences, for example, when they are orthogonal. It may be difficult for a large cell to provide orthogonal sequences to users, which may lead to interference. Interference that may be generated in a PRACH resource set due to non-orthogonal preamble sequences may depend on transmitted power.

Interference may become pronounced for UAVs, due to LOS interference channels, and thus, power control may be provided for random access for UAVs. In some embodiments, a RACH transmitted by a UAV with full path loss compensation may create interference to the following users: (i) a serving cell terrestrial WTRU that may be using the same PRACH resource set as the UAV with the preamble sequences of the terrestrial WTRU and the UAV being non-orthogonal and/or (ii) terrestrial users/UAVs that may be attached to neighboring cells that may be using designated PRACH resource sets of a serving cell (e.g. for data/RACH transmission).

A large number of MTC WTRUs and different coverage enhancement (CE) WTRUs may be serviced, for example, using three PRACH levels (e.g. resource sets). A PRACH resource set may be used by a WTRU, for example, when the WTRU's CE falls in a particular range. For example, an eNB may configure PRACH resource set-1 for WTRUs with coverage 0-5 dB (level-1), resource set-2 for WTRU with coverage 6-10 dB (level-2) and so forth. Each level may be allowed a fixed number of repetitions. In an example embodiment, a WTRU may use only one PRACH resource set at a time for RACH transmission.

Figure 8:
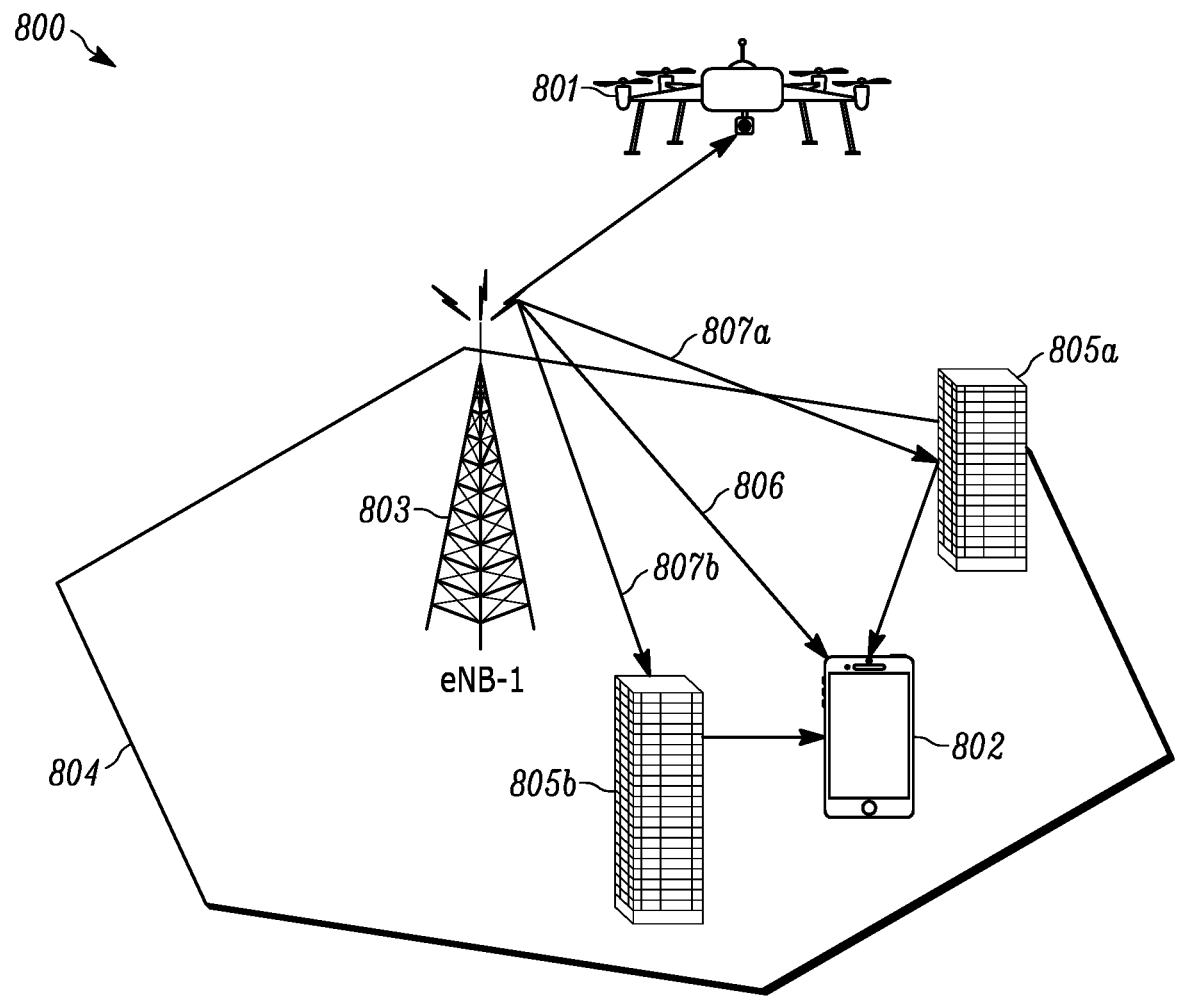
FIG. 8 is an example of coexistence between terrestrial WTRUs and UAVs.

FIG. 8 is an example scenario 800 of coexistence between terrestrial WTRUs and UAVs in cell 804, which is served by eNB 803 and contains buildings 805a and 805b. A UAV 801 and a terrestrial WTRU 802 may be connected to the same eNB 803. UAV 801, operating from a higher altitude, may have a clear line of sight to eNB 803. However, based on the exact position of terrestrial WTRU 802, which may experience shadowing due to ground clutter (obstacles, such as buildings, trees, hills), the communication path may be one or more of direct path 806, bounce-path 807a (bouncing from building 805a), and bounce-path 807b (bouncing from building 805b). Further, terrestrial WTRU 802 may experience a multi-path phenomenon in which it receives signals along two or more of paths 806, 807a, and 807b. This multi-path phenomenon may cause destructive interference.

An eNB may control inter-cell interference and may increase spectral efficiency of the system, for example, by performing appropriate open loop control for the terrestrial WTRU 802 and the UAV 801. An eNB may, for example: (i) apply the same power control to a UAV and a terrestrial WTRU and/or (ii) apply different power control for a terrestrial WTRU and a UAV (e.g. given that the propagation environments for the UAV and terrestrial WTRU may be different). The latter alternative may be implemented, for example, by open loop power control. A fixed level of interference (generated by both terrestrial WTRU 802 and the UAV 801) may be the design criterion irrespective of whether it is an aerial or terrestrial WTRU.

In general, a UAV may measure path loss from several eNBs and use the measurements to provide appropriate power control. In an example of an active signaling procedure, a UAV may signal the path loss it may experience from several eNBs to its serving eNB. eNBs may coordinate, for example, through backhaul, e.g., to estimate interference. Finally, the serving eNB may provide an appropriate power control mechanism to a UAV attached to it.

In an example of passive (e.g. non-signaling) power control, a UAV may determine appropriate power control, for example, by measuring path loss of the neighboring cells, which may occur with assistance from a serving eNB, e.g., over a longer time scale. Uplink interference management for eNBs may be provided. Procedures dealing with reference signal interference (e.g. when UAVs have access to more than 6 cells for measuring path loss using Cell-specific Reference Signals (CRS)) may be provided. Procedures may be provided for UAV specific RACH access. UAVs may transmit at lower power (e.g. due to LOS channels), for example, to maintain similar interference levels for UAVs and terrestrial WTRUs. Reduced power transmissions by UAVs may reduce target SINR, which may result in reduced success rates for RACH.

Altitude-based open loop power control may be used for UAVs, in some embodiments. Open loop power control may permit UAVs and WTRUs to coexist, despite different channel propagation environments. Interference levels generated by WTRUs and UAVs may be the same or similar, although a separate open loop power control may be provided for UAVs.

Open loop power control (e.g. in LTE) may be given in some embodiments by Eq. (1):

$$P_i = \min\{P_{max}, 10\log M + P_o + \alpha_i PL_i\} \qquad \text{Eq. (1)}$$

where $P_i$ (i=1,2) may be a transmit power of a WTRU and UAV, respectively; $P_{max}$ may be a maximum transmit power of a WTRU or UAV; $P_0$ may be a target SINR at a base station; $PL_i$ (i=1,2) may be a path loss experienced by a WTRU and UAV, respectively; $\alpha_i$ (i=1,2) may be a fractional power compensation factor ($0 \leq \alpha_i \leq 1$) for a WTRU and UAV, respectively; and M may be a number of PRBs assigned. A WTRU may (in LTE) compensate for path loss fully ($\alpha_1 = 1$) or partly ($0 \leq \alpha_1 < 1$), which may be signaled in SIB2 (LTE scheduling information).

Path loss ($PL_i$) in Eq. (1) may be given in some embodiments by Eq. (2):

$$PL_i \approx 10 n_i \log d_i + \text{constant} \quad \text{Eq. (2)}$$

where $n_i$ (i=1,2) may represent a path loss exponent for a WTRU and UAV, respectively; and $d_i$ (i=1,2) may represent a distance of a WTRU and UAV, from the eNB 803 respectively.

In the example of FIG. 8, where UAV 801 and terrestrial WTRU 802 were both attached to eNB 803, the path loss is $PL_i = PL$ (i=1,2). In some embodiments, full path loss compensation ($\alpha_i = 1$) may be performed for both UAV 801 and WTRU 802. As described, UAV 801 may experience a free space channel propagation environment while WTRU 802 may experience a multi-path scenario, e.g., $n_1 > n_2$. In some embodiments, $n_1 \approx 3$ (e.g. a suburban scenario), and $n_2 \approx 2$ (free space path loss). Eq. (2), may indicate (e.g. in an example where there may be constant path loss and a differing propagation environment) that $d_1 < d_2$. In some embodiments, $d_i$ (i=1,2) may signify the interference level generated by WTRU 802 and UAV 801, respectively, for example, when they transmit in the uplink by compensating for the path loss. This may imply that an interference level generated by a UAV may be higher than interference generated by a WTRU, for example, when the same open loop power compensation may be performed for a UAV and a WTRU, which may be unacceptable for coexistence of UAVs and WTRUs.

The amount of path loss that may be compensated for UAVs may be less than for terrestrial WTRUs, e.g., given a fixed interference level, $d_i = d$ (i=1,2). UAVs may not need to compensate for path loss to the extent that terrestrial WTRUs do, e.g., due to more favorable channel conditions for UAVs. Thus, open loop path loss compensation may be different for UAVs and terrestrial WTRUs ($\alpha_1 \neq \alpha_2$). Path loss compensation performed by a UAV may be less than compensation performed by a WTRU, e.g., $\alpha_2 < \alpha_1$.

In some embodiments for a WTRU, full compensation ($\alpha_1 = 1$) may be performed for a path loss of $PL_1 = 5$ dB. Let $n_1 = 3$ (e.g. not free space propagation). Eq. (2) indicates for these parameters that $d_1 = 10^{1/6}$. Given the same interference levels for a UAV and a WTRU, $d_1 d_2 = 10^{1/6}$. Assuming $n_2 = 2$ (free space), path loss compensated by the UAV per Eq. (2) may be $PL_2 = 3.33$. This may indicate that a UAV compensates for 3.33/5 (66%) of the path loss compensated for by a WTRU, which may imply that $\alpha_2 = 0.66$, which may indicate that $\alpha_2 < \alpha_1$. The UAV may have generated more interference had the UAV used full power compensation like the WTRU.

A device category may be provided for devices capable of performing Air-Ground communications at varying altitudes (e.g. ground to 500 feet). Multiple (e.g. two) device categories (and/or subtypes) may be provided, for example, where one category may be for UAVs (e.g. small UAS) and another category may be for high altitude (e.g. above 500 feet), e.g., commercial passenger vehicles, unmanned vehicles, mission critical applications. An open loop power control parameter ($\alpha$) may be signaled separately in SIB2, for example, for a UAV category WTRUs (e.g. device category).

An eNB may (e.g. for a UAV device category) signal a $\alpha$ parameter, for example, depending on the height a UAV may be operating (which may roughly signify the environment it is operating under) based on one or more quantized levels. In some embodiments: a first level may be given by Level 1: ($h_1 < \text{height} \leq h_2$): $\alpha_a$ and a second level may be given by Level 2: ($h_2 < \text{height} \leq h_3$): $\alpha_b$.

UAVs or WTRUs, upon receiving different quantized levels of open loop power control parameters, may derive the value of a based on its actual height, e.g., by simple interpolation. Different interpolation procedures may be provided to a UAV by an eNB. An interpolation procedure may also be signaled. In some embodiments, two bits may suffice for signaling in a UAV open loop power control system with four different interpolation procedures. Signaling all possible interpolation procedures (which may be fixed) may be a one-time operation.

Open loop power control may be based on path loss estimation from neighboring cells. UAVs may detect several neighboring cells. Transmission power may be adjusted, for example, based on path loss of a serving cell and from neighboring cells, e.g., to avoid interference. Path loss estimation from neighboring cells may signify how much interference a UAV may generate for those cells. Experiencing less path loss from a neighboring cell may generate more interference to that cell. Reducing a transmit power of a UAV to cause less interference to a neighboring cell need not always be acceptable, because it may also reduce target SINR. Coordinated power control may be provided by multiple eNBs, for example, using path loss information. In some embodiments, UAV may compare any or all of: (1) the path loss to the serving cell, (2) the path loss to one or more neighboring cells, and (3) the path compensation factor with an appropriate threshold. If conditions are met, which may be that the compared values are above, below, or meeting the corresponding appropriate threshold, the UAV (aerial WTRU) may trigger a reporting event.

Figure 9:
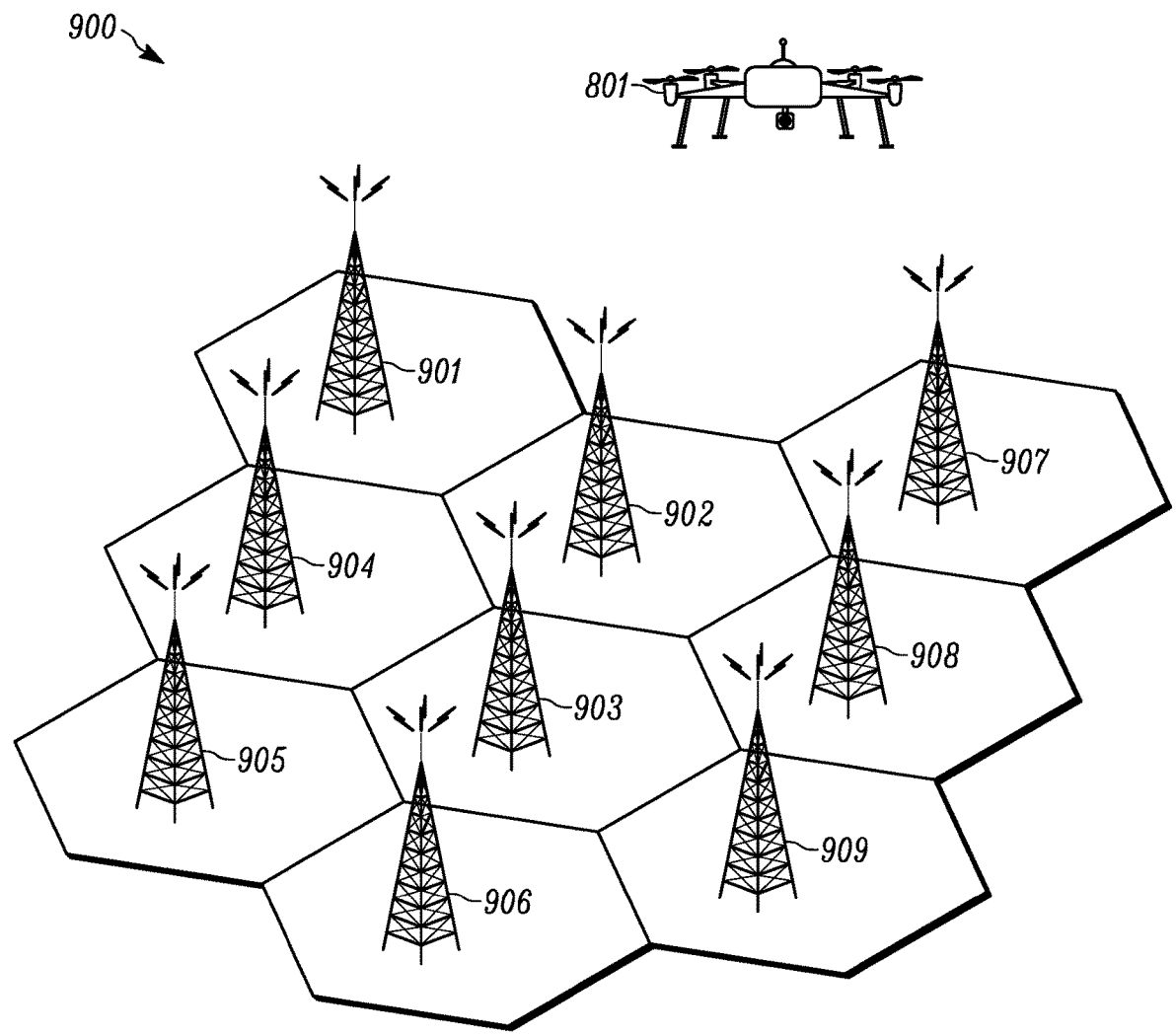
FIG. 9 is an example of a drone under coverage of multiple cells.

FIG. 9 is an example scenario 900 of UAV 801 under coverage of multiple cells 901-909. One of cells 901-909 is the serving cell for UAV 801. In the example scenario 900 it may be assumed there is no interference among cell specific reference signals (CRS). A serving eNB may provide CRS reference signal power that may be used by a neighboring eNB in a system information broadcast (SIB) (e.g. SIB-2 and/or serving cell parameters). This information may be obtained by a serving cell, for example, through backhaul eNB cooperation. UAV 801 (or a WTRU that can see multiple eNBs) may estimate the path loss for each of the neighboring cells and may report estimates or measurements to the serving cell. The estimate may be accomplished, in some embodiments, by using measurements of the reference signal power. UAV 801 may report, for example, a cell-id and its corresponding path loss to the serving cell.

The eNBs of cells 901-909 may provide the above reported path loss information to the appropriate cells (e.g. inferred from a reported cell-id), for example, through an X2 interface. This exchange of information may provide the interference levels (e.g. roughly inferred from the path loss levels) that each cell may experience due to UAVs connected to other cells.

In some embodiments, target SINR ($P_0$) and open loop power control parameter ($\alpha$) in Eq. (1) may be reconfigured by a serving cell, for example, based on (e.g. inferred from) interference levels generated by UAVs or WTRUs to other cells. A reconfiguration may be signaled (e.g. through SIB2) to UAV 801. UAV 801 may alternatively or additionally provide a measurement report directly to neighboring cells indicating, for example, the respective path loss it experiences, instead of reporting to the serving cell and relying upon the serving cell using the X2 interface to forward this information. In some embodiments, a serving eNB may provide CRS reference signal power that may be used by a neighboring eNB in SIB (e.g. SIB-2 and/or serving cell parameters).

In some embodiments, a UAV may provide a measurement report that may include a cell-id and a path loss of a neighboring cell (e.g. obtained using CRS of that cell) to a serving cell. In some embodiments, a UAV may provide a measurement report directly to a neighboring cell, with the report containing path loss information that the UAV experiences from the neighboring cell. In some embodiments, an eNB may exchange (e.g. through X2 interface) path loss information that its serving members may experience with other eNBs/neighboring cells.

Dynamic power control may be driven by WTRUs. A UAV may measure a path loss from each neighboring eNB, using a procedure disclosed herein. A serving eNB may signal $\alpha$, $P_o$ in SIB (e.g. based on one or more rules), for example, instead of eNBs actively exchanging signaled path loss from UAVs to infer interference levels. Rules may include, for example: (i) Rule-1, e.g., set $\alpha=\alpha_1$, for example, when a minimum path loss among neighbor cells may be less than x dB and/or (ii) Rule-2, e.g., set $\alpha=\alpha_2$, for example, when a path loss of at least n neighboring cells (e.g. n is any integer) may be less than y dB.

An event reporting trigger may be defined based on any number and type of example rules. A trigger may be sent, for example, as a part of an RRC reconfiguration message. In an example provided below, an event trigger (underlined) may be sent as a part of a measurement control message:

```
+-rrcConnectionReconfiguration ::= SEQUENCE
       +-rrcConnectionReconfiguration-r8 ::= SEQUENCE [100000]
       +-measConfig ::= SEQUENCE [01010111111] OPTIONAL:Exist
+-reportConfig ::= CHOICE [reportConfigEUTRA]
    | |     +-triggerType ::= CHOICE [event]
    | |     | +-event ::= SEQUENCE
    | |     | | +-eventD1 ::= SEQUENCE
              neighCelllist:{1,2,3,4}
              eventId: eventD1: eventD1 ::= {
              D1-Offset: 2
```

Event trigger (e.g. D1) may implement example rule(s) (e.g. Rule-1 and Rule-2). A measurement control message may provide a neighbor cell list (e.g. neighCelllist), which may be monitored for triggering event D1. It may provide an offset (e.g. D1-Offset: 2) that may indicate event D1 may be triggered, for example, when a neighbor cell path loss may be 2 dB less than a serving cell path loss.

With this scheme, UAVs and WTRUs may not need to continually signal path loss to an eNB. Rules may be reconfigured (e.g. from time to time) by an eNB. Uplink Modulation and Coding Scheme (MCS) parameters may be provided by an eNB for dynamic open loop power adaptations and WTRU or UAV response signaling.

An eNB may provide an MCS that a WTRU or UAV may use (e.g. should be using) for different path losses that may be encountered. An eNB may signal an MCS to use, for example, corresponding to one or more rules, such as the following: (i) Rule-3, e.g., Set $\alpha=\alpha_1$ and MCS index=$m_1$, for example, when a minimum path loss among neighbor cells may be less than x dB and (ii) Rule-4, e.g., Set $\alpha=\alpha_2$ and MCS index=$m_2$, for example, when a path loss of at least n neighboring cells (e.g. n may be any integer) may be less than y dB.

In some embodiments (e.g. for Rule-3, Rule-4), $m_1$, $m_2$ may be signaled in downlink Control information (DCI) (Format-0 ) in a Physical Downlink Control Channel (PDCCH), for example, by providing an MCS index for each rule (e.g. $m_1$, $m_2$ may each occupy five bits).

An eNB may (e.g. in lieu of five bits each for uplink open loop MCS associated with each rule) signal them as an offset from a base MCS value. In some embodiments, a base MCS value may denote an optimal MCS that a WTRU or UAV may use based (e.g. only) on an estimated uplink channel to its serving cell. In some embodiments, an optimal MCS index to use based on uplink channel may be, for example, 10 (e.g. an MCS value that may be provided by an eNB using DCI Format-0), $m_1=12$ (e.g. based on Rule-3) and $m_2=9$ (e.g. based on Rule-4). MCS signaling from an eNB may be, for example, [10 2 −1], where MCS index 10 may be understood by WTRUs/UAVs and the offset index: 2 and −1 may be the signaling parameters included for MCS open loop power adaptation.

A UAV may (depending on encountered path loss) use a corresponding value of an MCS index (e.g. $m_1$, $m_2$) that may be associated with a rule. A UAV may signal the index of a rule that may be used by the UAV. In some embodiments, there may be multiple rules (e.g. two rules Rule-3,4) and an MCS index that may be associated with each rule. A UAV may use one bit (or additional bits to signify an MCS index/Rule index) that may be used to signal an eNB. An MCS index/Rule index may be signaled, for example, in a physical uplink control channel (PUCCH), e.g., using format-0/format-1/format-2 along with ACK, SR, and CSI.

Figure 10:
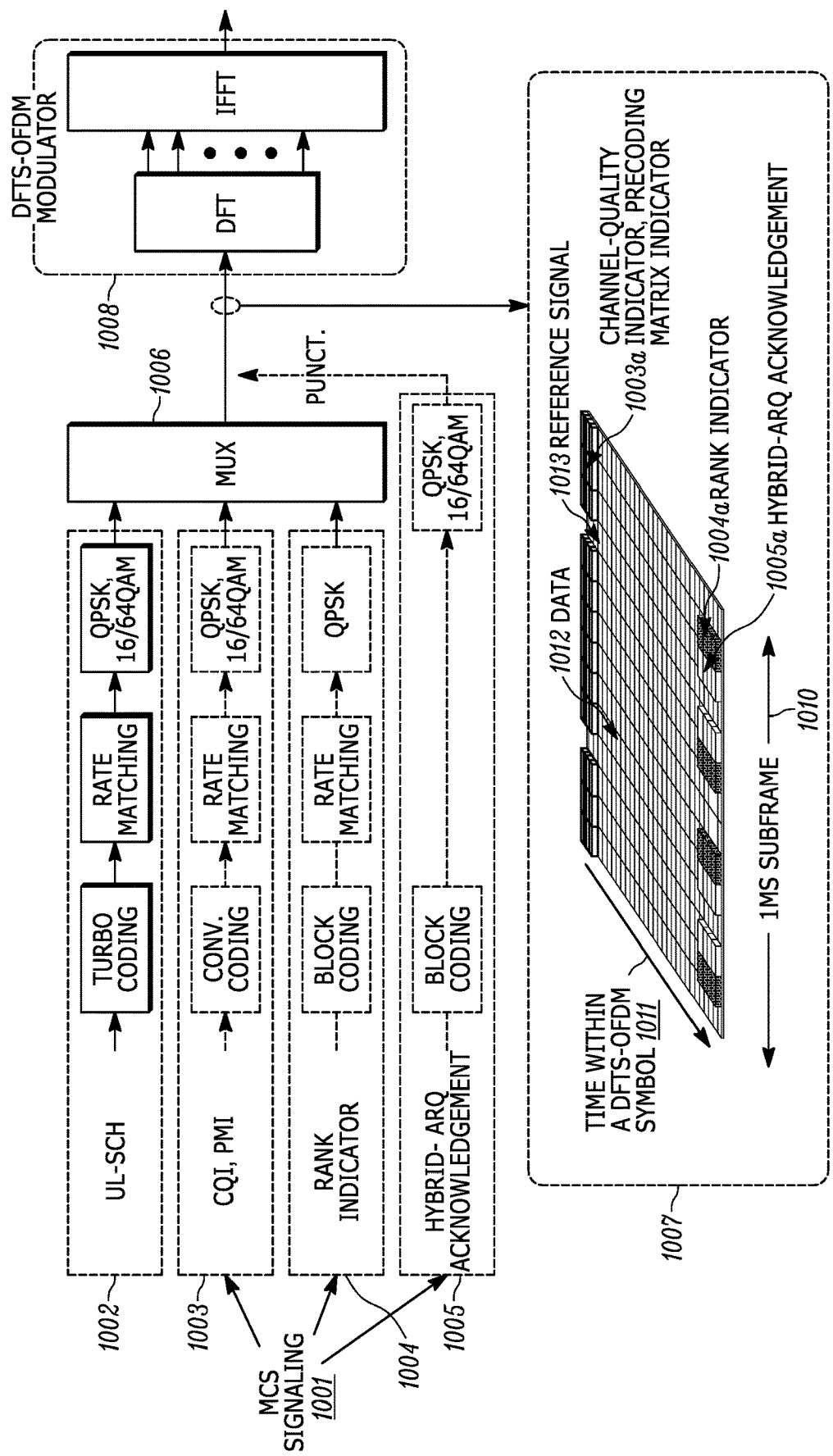
FIG. 10 is an example of a UAV signaling modulation and coding scheme (MCS) parameters for dynamic open loop power adaptation in a physical uplink shared channel (PUSCH) to an evolved Node B (eNB).

FIG. 10 is an example of a UAV signaling modulation and coding scheme (MCS) 1001 parameters for dynamic open loop power adaptation in a physical uplink shared channel (PUSCH) to an eNB. An MCS index/Rule index may be signaled (e.g. to an eNB), for example, with control data that may be multiplexed along with data in PUSCH (e.g. as shown by example in FIG. 10). In some embodiments, MCS signaling may be sent in parallel with the uplink shared channel (UL-SCH) 1002, along with any part of the control, such as channel quality indicator, precoding matrix indicator (CQI/PMI) 1003, Rank Indicator 1004, or Hybrid ARQ (HARQ) acknowledgment 1005.

As illustrated in FIG. 10, UL-SCH 1002, CQI/PMI 1003, and Rank Indicator 1004 are combined with multiplexer 1006. The resulting output signal 1007 passes through a DFT-OFDM modulator 1008. Examining output signal 1007 in more detail, an exemplary 1 ms subframe 1010 is shown relative to time 1011 within a symbol. Data 1012 occupies most of the subframe. The multiplexed positions of CQI/PMI 1003, Rank Indicator 1004, and HARQ acknowledgment 1005 are indicated as 1003a, 1004a, and 1005a, respectively. Reference signals 1013 are interspersed between CQI/PMI 1003 a positions at the start of the symbol.

CRS may be transmitted in the DL that enables a WTRU or UAV to estimate path loss under the approximation that downlink path loss may provide a good estimate for uplink path loss. However, the reciprocal nature of the UL and DL path loss may not always support such an approximation. Thus, in some embodiments, a reference signal may be transmitted by an eNB using uplink resources for path loss estimation. A reference signal may be transmitted on an uplink band for WTRU or UAVs to estimate path loss for power control purposes. In some embodiments, a reference signal sequence may use gold sequences (e.g. similar to downlink CRS), for example, in addition to providing a physical cell-id. RRC signaling may be used to indicate to a WTRU subframes/PRBs where reference signals may be transmitted for path loss estimation. An eNB may choose appropriate PRBs to transmit a reference signal, for example, given that an eNB may be aware of uplink scheduling decisions for WTRUs it serves. A reference signal may be transmitted, for example, once every few sub-frames/frames or at a configurable rate that may be signaled to a WTRU through RRC or other mechanisms.

UAVs may estimate path loss using one or more procedures. In some embodiments, there may be a common resource set (e.g. in uplink or downlink) that (e.g. all) eNBs may use to transmit their reference (e.g. orthogonal or approximately orthogonal) sequence. An (e.g. each) eNB may be assigned a unique orthogonal sequence. A common resource set that eNBs may use and unique reference orthogonal sequences for each eNB may be agreed upon by some or all eNBs, for example, by X2 signaling. A serving eNB may then provide this information (e.g., common resource set, sequence) to a WTRU or UAV, for example, through RRC. WTRUs and UAVs may correlate with each of orthogonal sequences (e.g. that may represent a distinct eNB), for example, to estimate a path loss from every eNB. This example may represent a dual version of the next example.

Interference estimation by the eNBs may be provided, in some embodiments, using uplink reference signals. An uplink reference signal may be used to enable eNBs to measure interference from UAVs that may be attached to different cells in scenarios where UAVs see multiple neighboring cells. In some embodiments, eNBs may measure interference without dedicated WTRU-eNB active coordination mechanisms. Radio resources may be blanked (e.g. in a coordinated way) by multiple eNBs e.g. (in uplink PRBs) to measure interference from a UAV. This mechanism may not scale because the coordination mechanism becomes cumbersome with multiple drones, as the interference measurement/coordinated blanking for multiple eNBs needs to be done for every drone.

Figure 11:
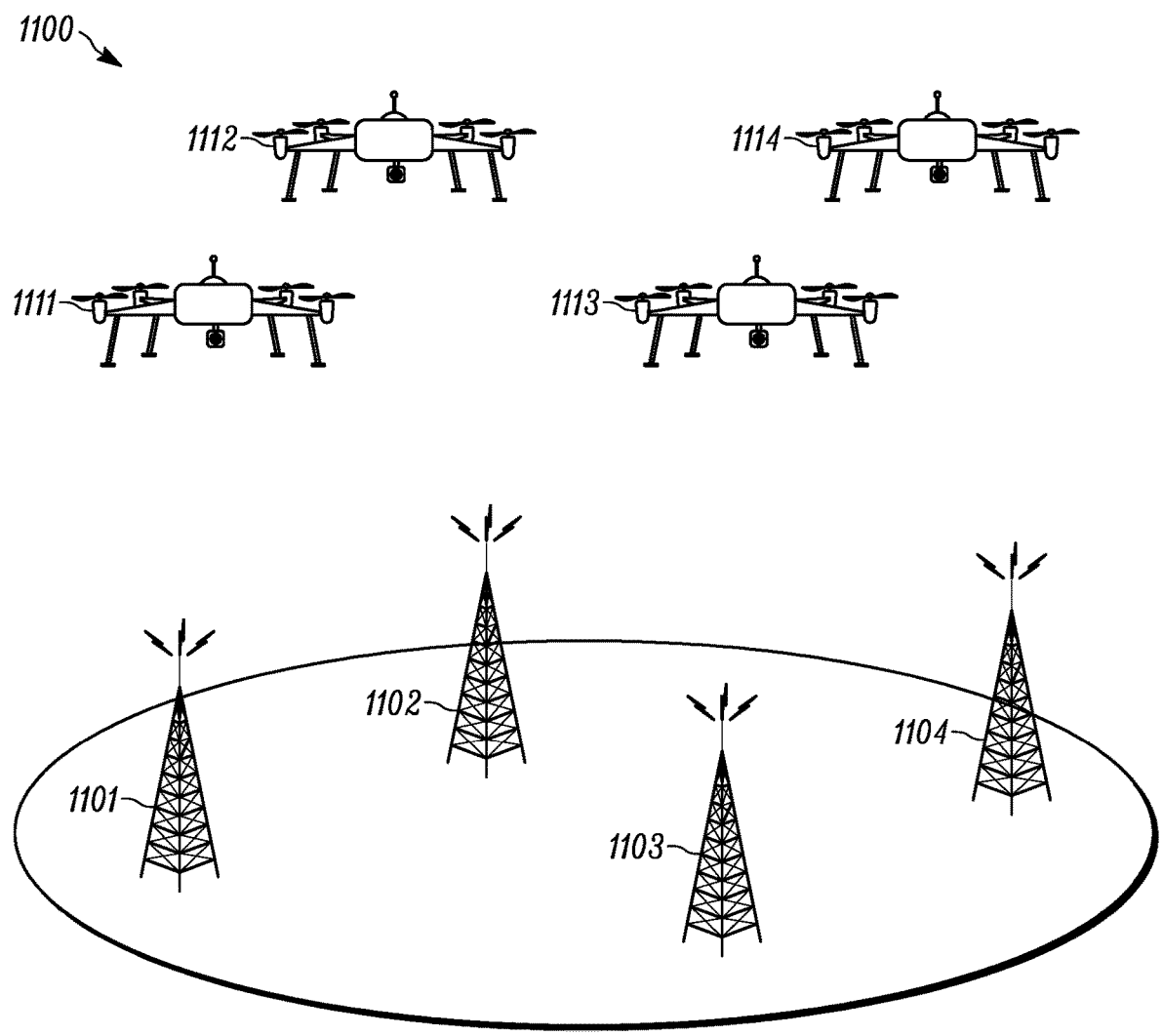
FIG. 11 is an example of multiple UAVs under coverage of a common group of eNBs.

FIG. 11 is an example of multiple UAVs 1111-1114 under coverage of a common group of eNBs 1101-1104. Each of UAVs 1111-1114 may be similar to UAV 801 of prior figures. In the example of FIG. 11, UAV 1111 is under coverage of eNB 1101; UAV 1112 is under coverage of eNB 1102; UAV 1113 is under coverage of eNB 1103; and UAV 1114 is under coverage of eNB 1104. The eNBs 1101-1104 may allocate uplink common resource sets (e.g. interference resource sets) that may be defined in terms of PRBs common to multiple (possibly all) eNBs in the group and may be used to transmit an uplink reference signal (e.g. Interference Measurement-Reference Signal or IM-RS).

The group of eNBs 1101-1104 decide on the orthogonal reference sequences or PN reference sequences that each of the eNB needs to provide for its serving nodes, communicating with each other through the X2 interface. The primary requirements for the set of orthogonal reference sequences or PN-sequences are low cross correlation and high autocorrelation, so that the group of eNBs (1101-1104) may participate in the uplink interference measurement process. A common resource set (interference resource set) is assigned in terms of PRBs/Resource Elements/Resource Element Groups that is common to the eNB group where the UAVs (i.e., any of 1111-1114) that are connected to any eNB in this group (i.e., any of 1101-1104) transmit their assigned reference sequence. The common resource set and the reference sequences are signaled by the serving eNB to the UAV. The UAV receives the root sequence from the serving eNB; then chooses at random a sequence from the orthogonal sequences obtained from the root sequence; and then transmits in the uplink using the selected sequence in the common resource set. To measure the interference generated by all UAVs connected to any serving cell, any eNB in the group correlates the signal received on the common resource set with each of the reference sequences (assigned to the eNB group) and measures the power. This provides an interference measurement. One or more eNBs in the group could report to the group (through X2) that increased traffic is seen, in terms of the number of UAVs attached. The eNBs in the group could then reconfigure the sequence assignment in terms of the number and length of reference sequences assigned to the eNBs.

Figure 12:
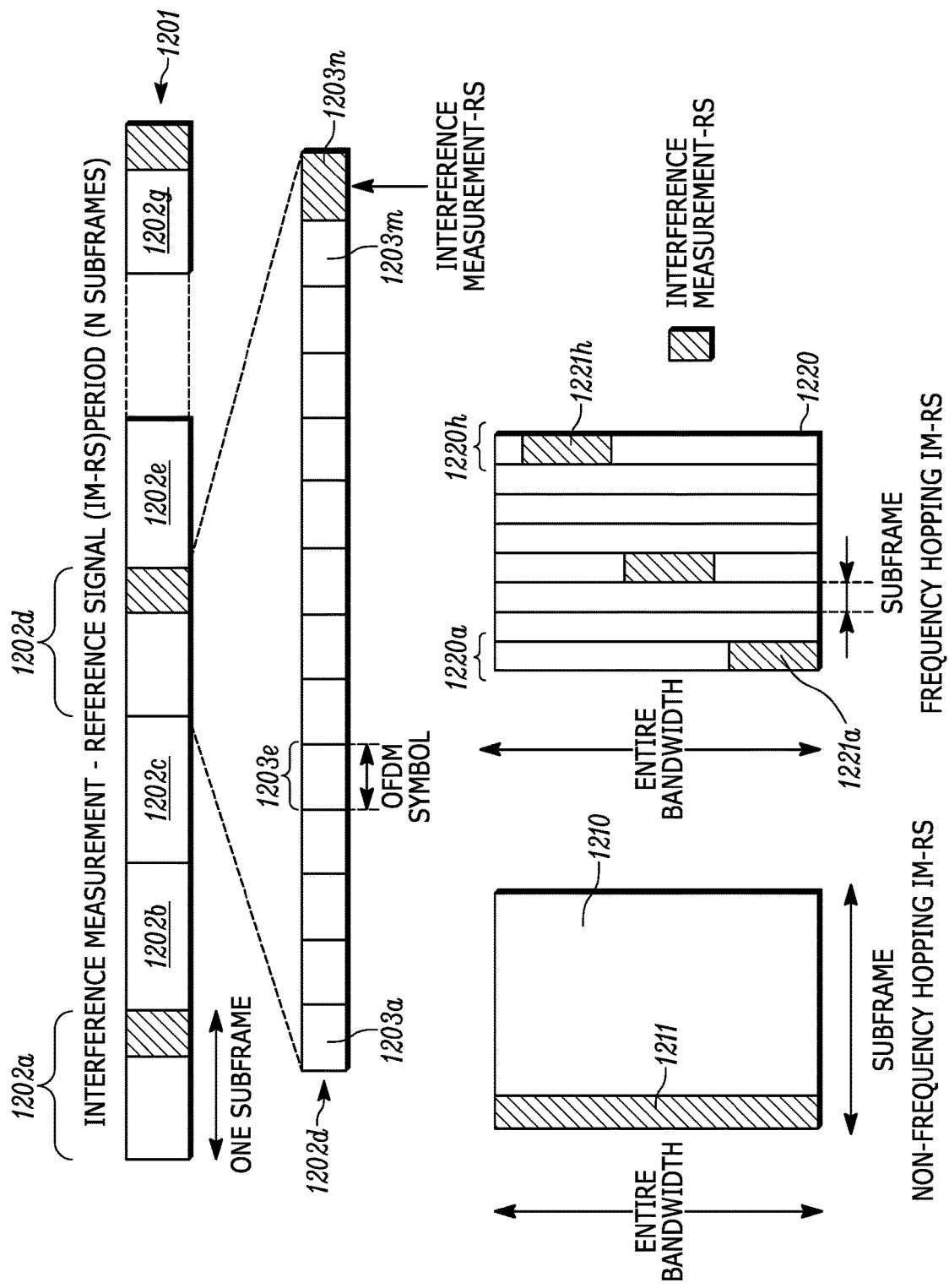
FIG. 12 is an example of placement of an Interference Measurement Reference Signal (IM-RS).

FIG. 12 is an example of placement of an Interference Measurement Reference Signal (IM-RS) every three subframes. Subframes 1202a-10202e and 1202g are shown. Subframes 1202a, 1202d and 1202g each contain an IM-RS. A detailed expansion of subframe 1202d is shown comprising OFDM symbols 1203a, 1203e, and 1203m. The IM-RS at the end of subframe 1202d is IM-RS 1203n. As illustrated in FIG. 12, an uplink reference signal may occupy an entire bandwidth and an OFDM symbol (e.g. as in sounding reference signals (SRS)) in non-frequency hopping mode (e.g. wideband mode) or in a frequency-hopping mode. In the non-frequency hopping mode, a single subframe 1210 is illustrated, with a single IM-RS 1211 spanning the entire bandwidth. The frequency hopping mode 1220, there are multiple subframes 1220 a-1220 h. The two IM-RSs 1221a and 1221h, in subframes 1220a and 1220h respectively, each occupy less than the entire bandwidth.

In some embodiments, a serving eNB may provide a reference signal (e.g., root sequence) to be used by multiple (e.g. all) UAVs served by the eNB (e.g. through RRC). This may occur, for example, after all eNBs in a group (e.g. 1 through 4 ) concur on sequences to be used by each of them (e.g. through the X2 interface). In an (e.g. alternative) example, UAVs may randomly choose a random sequence from a root sequence provided by the eNB (e.g. a long sequence to minimize a probability of collision). The root sequence may be signaled to a UAV, for example, by a serving eNB. As an example, the WTRU or UAV chooses a random sequence by performing a cyclic shift of the root sequence provided by the eNB.

In some embodiments, a group of eNBs may (e.g. through the X2 interface) decide on orthogonal reference sequences or PN reference sequences that each of the eNBs may provide for its serving nodes. A set of orthogonal reference sequences or PN-sequences (e.g. with low cross correlation and high autocorrelation) may be common to a group of eNBs participating in an uplink interference measurement process. A common resource set (e.g. interference resource set) in terms of PRBs/Resource Elements/Resource Element Groups may be common to an eNB group where UAVs connected to an eNB in the group that may transmit an assigned reference sequence. A common resource set and reference sequences may be signaled by a serving eNB to a UAV.

A UAV receiving a root sequence from a serving eNB may select (possibly at random) an orthogonal sequences obtained from the root sequence (e.g., by performing cyclic shift of the root sequence). The UAV may transmit in uplink using the selected sequence in the common resource set. One or more eNBs in a group may report to the group (through X2) when it experiences an increase in traffic, such as the number of UAVs attached. The eNBs in the group may then reconfigure a sequence assignment in terms of the number and length of reference sequences assigned to the eNBs.

Figure 13:
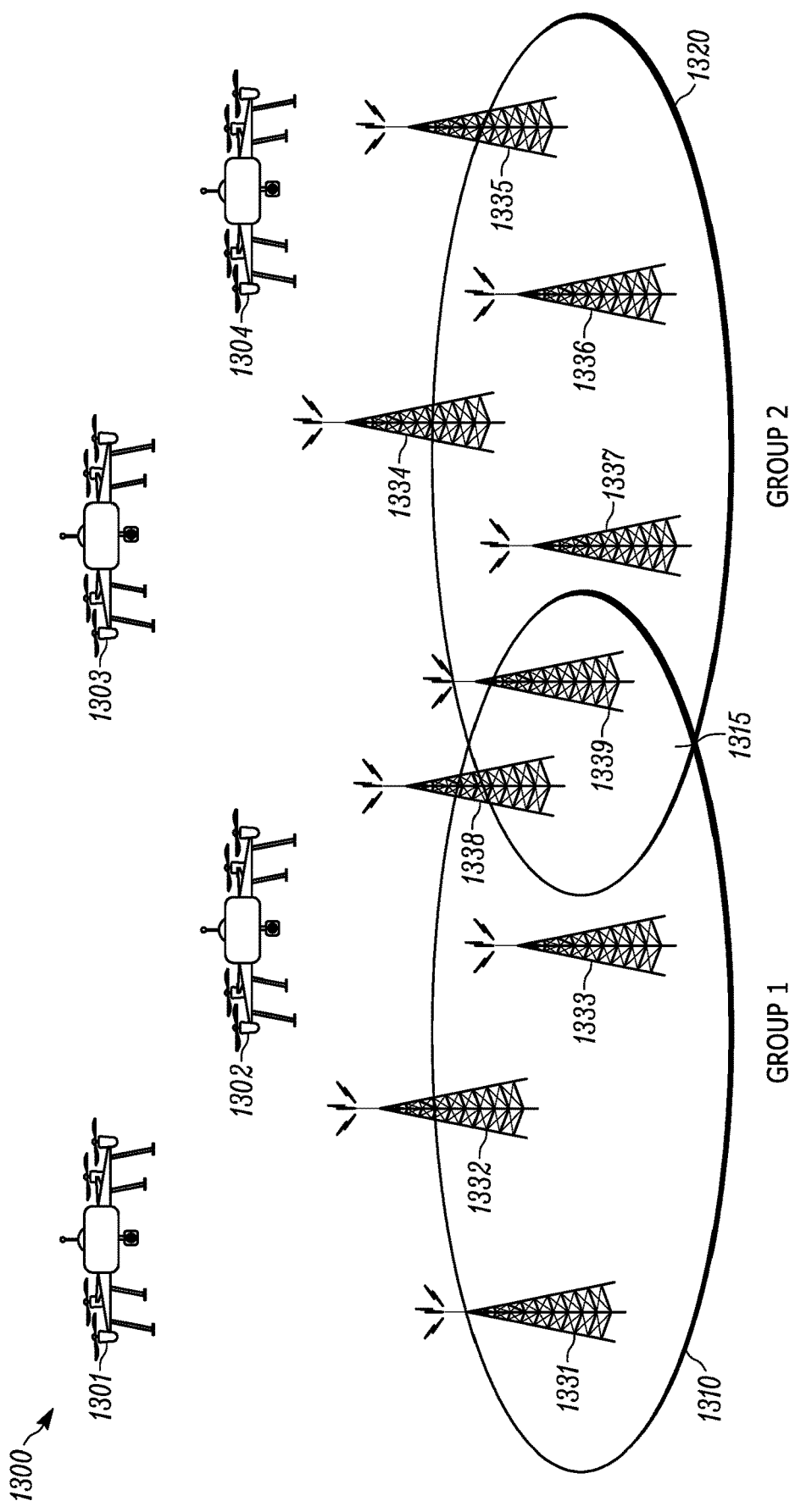
FIG. 13 is an illustration of an example of different zones under different coverage sets.

FIG. 13 is an illustration of a scenario 1300 of different zones, Group 1 1310 and Group 2 1320, under different coverage sets. Group 1 1310 comprises eNBs 1331-1333 and 1338-1339. Group 2 1320 comprises eNBs 1334-1337 and 1338-1339. Thus, eNBs 1338 and 1339 are common to both groups (1310 and 1320 ). UAVs 1301-1304 are present. In the example embodiment of FIG. 13, UAVs 1301 and 1302 are under control of Group 1 1310; UAVs 1303 and 1304 are under control of Group 2 1320.

In an example model for uplink interference measurement, a predefined number and set of orthogonal sequences may be shared among eNB groups (for example groups 1310 and 1320). Predefined orthogonal sequences may, for example, be based on a maximum number of UAVs that an eNB group may encounter at any point in time, which may be predicted or may be obtained from history. For simplicity in the example shown in FIG. 13, two orthogonal sequences may be shared by the two eNB groups 1310 and 1320, each group serving two UAVs each (1301/1302 and 1303/1304, respectively).

A unique common resource set may be defined for each group. In some embodiments, Group-1 1310 eNBs may use a mutually exclusive interference resource set from what may be used by Group-2 1320 eNBs. In some embodiments, eNBs in the set: {Group-1\(Group-1∩Group-2)} and {Group-2\(Group-∩Group-2)} may be far apart and eNBs in the sets may use the same interference resource set. Mutually exclusive interference resource sets may be defined for common eNBs (e.g. Group-1∩Group-2 . In some embodiments (e.g. for simplicity), there may be two interference resource sets defined.

In some embodiments, eNBs may indicate an interference resource set and orthogonal sequences that UAVs may use (e.g. should be using). As an example, consider eNBs-1338 and 1339 that are common to both groups 1310 and 1320 and thus may service all four UAVs 1301-1304 with two sequences (Sequence-1,2). The eNBs 1338 and 1339 may ensure that UAVs using the same sequences use a different interference resource set. For example, UAV 1301 and UAV 1303 may use a different interference resource set and UAV 1302 and UAV 1304 may also use a different interference resource set.

A sequence and interference resource set assignment by eNBs may be performed, for example, based on the location of UAVs. One or more interference resource assignments (e.g. PRBs, RE, REG) may be based on geographical locations with respect to eNB groups. A UAV may provide a CRS measurement of cells in its coverage and its location information. eNBs may exchange this information (e.g. through X2) among group members and may (e.g. jointly) decide on sequence and interference resource information. A UAV may receive sequence information and interference resource set information from its serving eNB. An eNB may access a location database/radio environment map and may transmit sequence information and an interference resource set to UAVs for uplink reference signal transmission.

Figure 14:
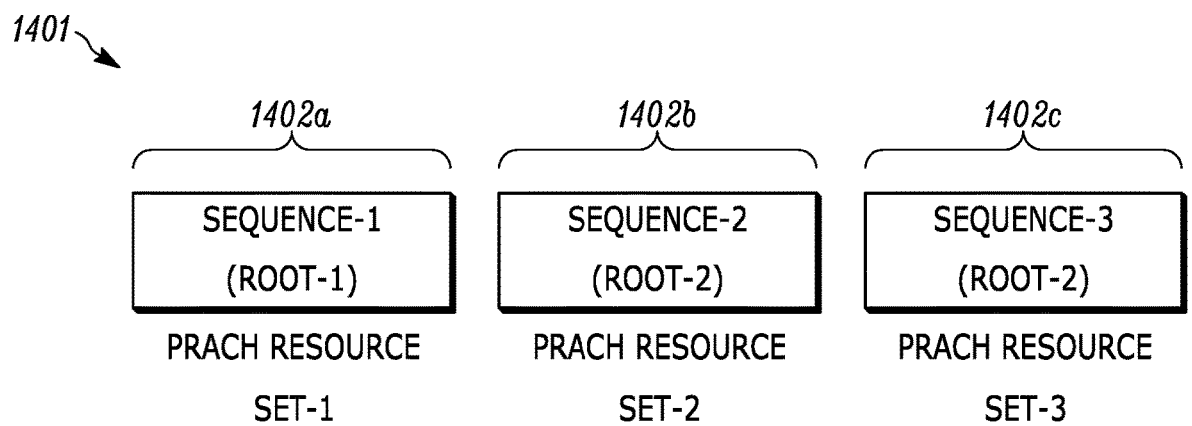
FIG. 14 is an example of a concatenated Zadoff-Chu (ZC) sequence approach to random access for UAVs.

In some embodiments, reference signals assigned to UAVs may be mutually orthogonal. In the example of FIG. 14, a set 1401 of sequences may comprise Sequence-1 1402a, Sequence-2 1402b, and Sequence-3 1402c are shown. In some embodiments, these may be Zadoff-Chu (ZC) sequences. Alternatively, sequences may alternatively be PN sequences that may have very low cross correlation and high autocorrelation (e.g. Gold code sequences). This information may be signaled by a serving eNB to UAVs, for example, through RRC signaling/SIB-2, etc.

An uplink reference signal may be transmitted at specified subframes with a certain periodicity. This information may be signaled by a serving eNB to UAVs, for example, through RRC signaling/SIB-2, etc. An uplink reference signal may occupy an entire bandwidth and an OFDM symbol (e.g. as in SRS) in non-frequency hopping mode (e.g. wideband mode) or in a frequency-hopping mode (e.g. as shown by example in FIG. 12). The length of reference sequences that may be assigned to UAVs may vary, for example, depending on a number of UAVs for which interference measurement may be performed. In some embodiments, a length of sequences may be dependent on a total number of UAVs serviced. Bandwidth allocated for IM-RS may be dynamic, e.g., dependent on the length of the reference sequence, which may depend on the total number of UAVs served in an eNB group. Interference generated by a UAV may be measured by an eNB, for example, by correlating a signal received on a common resource set with each reference sequence and measuring the power.

In some embodiments, a serving eNB may provide a reference signal (e.g., root sequence) to be used by multiple (e.g. all) UAVs served by the eNB (e.g. through RRC). This may occur, for example, after all eNBs in a group concur on sequences to be used by each of them (e.g. through the X2 interface). In an alternative embodiment, UAVs may randomly choose a random sequence from a root sequence provided by the eNB (e.g. a long sequence to minimize a probability of collision). The root sequence may be signaled to a UAV, for example, by a serving eNB. As an example, the WTRU or UAV may choose a random sequence by performing a cyclic shift of the root sequence provided by the eNB.

In some embodiments, a group of eNBs may (e.g. through the X2 interface) decide on orthogonal reference sequences or PN reference sequences that each of the eNBs may provide for its serving nodes. A set of orthogonal reference sequences or PN-sequences (e.g. with low cross correlation and high autocorrelation) may be common to a group of eNBs participating in an uplink interference measurement process. A common resource set (e.g. interference resource set) in terms of PRBs/Resource Elements/Resource Element Groups may be common to an eNB group where UAVs connected to an eNB in the group that may transmit an assigned reference sequence. A common resource set and reference sequences may be signaled by a serving eNB to a UAV. The UAV may transmit in the uplink using the selected sequence in the common resource set.

Path loss estimation may be provided by using downlink reference signals. A UAV may detect several eNBs. A UAV may decode a CRS, measure a path loss of eNBs and perform appropriate power control. A CRS may be interference free, for example, for six (6) cells. PRBs for a CRS may be orthogonal for the six (6) cells. Any eNBs that satisfy (cell-id mod 6=i) may have the same CRS placements in the frequency domain. In some situations, a UAV may be under the coverage of multiple cells with the same mod-6 value. CRS interference may occur between these eNBs, for example, when a UAV attempts to decode a CRS of those cells. Terrestrial WTRUs may not have this problem, as they may not be able to detect distant eNBs around a serving eNB.

In some embodiments, there may be dynamic blanking of CRS. A CRS may be present in every PRB and sub-frame. CRS may be implemented with minor modifications, for example, to provide backward compatibility. A CRS of eNBs may be dynamically (e.g. randomly) blanked, which may avoid interference of CRS with other eNBs. Structure may be added to random blanking of CRS.

For example, let $\{F_i\}$ represent a set of eNBs whose cell ids may satisfy cell-id mod 6=i (i=0,1,2, . . . 5). For simplicity, let $\{F_i\}$ be arranged in increasing order and assume that a difference between cell-ids in $\{F_i\}$ may be directly proportional to the distance between the eNBs. Divide $\{F_i\}$ in groups of five eNBs each. Denote the groups as $f_k$(k=1,2, . . . ). Each $f_k$ may have five eNBs each. Consider one such group, $f_1=\{n_0, n_1, n_2, n_3, n_4\}$, where $n_j$(j=0,1,2,3,4) may represent cell-ids. $n_j$ may transmit CRS in subframe j, j+5, (j=0,1,2,3,4) on all PRBs. A similar procedure may be followed for $f_2$, $f_3$, etc.

There may be, for example, a partial coordination between eNBs with the same CRS PRBs assignment (e.g. due to same value of cell-id mod 6). In some embodiments (e.g., as described above), interfering cell-ids may transmit on two sub-frames on all PRBs in an interference free manner over a radio frame. Interfering eNBs within a group may transmit on different sub-frames in a radio frame. The foregoing example protocol may be followed, for example, (e.g. only) during specific instants of time that may be preconfigured among eNBs, e.g., to maintain backward compatibility of CRS. In an (e.g. alternative example), division into groups of two eNBs may occur (e.g. instead of division into groups of five eNBs, as described above), which may result in each eNB within a group transmitting CRS in subframe j, (j+2 ), (j+4), (j+6), (j+8), j=0,1.

Partial coordination may be provided among eNBs to avoid CRS interference. A grouping mechanism may be used so that eNBs within a (e.g. the same) group may transmit CRS in different sub-frames while members in different groups may transmit concurrently. UAV category WTRUs (e.g. UAVs) may receive CRS blanking information from an eNB, which may indicate a starting SFN, repetition period etc. UAVs may actively measure a CRS from neighboring base stations during these periods. UAVs may transmit measured CRS outcome to a serving eNB. Dynamic blanking of CRS may be coordinated. A UAV may notify a serving cell of cell-ids for which the UAV may be unable to detect CRS. A serving cell may coordinate with those eNBs, for example, to make the CRS of those eNBs decodable to a serving cell UAV.

In some embodiments, a serving cell may provide a UAV with cell-ids of cells to monitor. A UAV may report to a serving cell the cell-ids of cells for which the UAV may be unable to detect CRS. A serving cell may coordinate with eNBs so that a UAV in a serving cell may be able to decode a CRS of interfering eNBs, for example, by performing one or more of the following: (i) blanking CRS among those eNBs (e.g. in a structured manner) and/or (ii) random blanking of CRS among interfering eNBs.

In an alternative example, a new reference signal, e.g. "Path Loss Reference Signal" (PL-RS) may be defined. PL-RS may be transmitted by eNBs, for example, during a certain duration (e.g. periodically or aperiodically), e.g., to enable path loss (PL) measurements by UAVs. Configuration parameters (e.g. as to when PL-RS) may be transmitted may be signaled to a WTRU or UAV, for example, by a serving eNB through RRC etc. PL-RS may indicate its cell-id. The eNBs may use (e.g. orthogonal or approximately orthogonal) sequences where all eNBs may transmit a reference sequence in the same resource set. A WTRU or UAV may correlate with an appropriate sequence to find a path loss from an eNB.

UAVs may be provided with random access. Transmit power for UAVs may be more constrained (e.g. less compensation for path loss) to maintain the same level of interference as for terrestrial WTRUs. This may result in reduced target SINR for UAVs, which may result in reduced reliability and may (e.g. also) negatively impact the RACH success probability for UAVs. A RACH system for UAVs may (i) have reduced power spectral density (PSD) per PRB compared to terrestrial WTRUs (e.g. to control interference) and (ii) be able to achieve a target SINR (e.g. to maintain RACH success rate). Random access for UAVs may be provided, for example, based on ZC sequences by comprising transmitting ZC sequences over the RACH. .

In some embodiments, a length of a ZC sequence may be increased, for example, by concatenating different individual ZC sequences. A sequence may be transmitted over a wider spectrum (e.g. multiple PRACH resource sets), for example, to decrease PSD per PRB. Spread spectrum communication principle is used, for example, to distribute information over a wider spectrum with reduced PSD. A coded sequence may be a ZC sequence. A smaller ZC sequence may be coded, for example, to obtain a longer ZC sequence. Constrained coding may be applied, for example, where a coded sequence may be ZC, for example, to satisfy autocorrelation/cross-correlation properties of a ZC sequence. In some embodiments, multiple ZC sequences may be concatenated to satisfy this criterion.

FIG. 14 is an example of a concatenated ZC sequence approach to random access for UAVs. There may be an arbitrary number of PRBs (e.g. PRACH resource sets) over which a concatenated sequence may be transmitted. In some embodiments (e.g. as shown in FIG. 14) there may be three PRACH resource sets, Sequence-1/Root-1 1402a, Sequence-2/Root-2 1402b, and Sequence-3/Root-31402c. In some embodiments, these may be consistent with PRACH resource sets that may be defined for MTC. A UAV PRACH transmission (e.g. a reduced power RACH transmission) may be based on one or more of the following, for example: Three (or more) distinct preamble ZC root sequences (e.g. Root-1, Root-2 and Root-3) may be used for PRACH resource sets-1, 2 and 3, respectively. Root sequences may be dedicated for UAVs RACH purposes.

In some embodiments, a set of (e.g. all) ZC preamble sequences for a (e.g. each) PRACH resource set may be obtained from their respective root sequence, for example, by performing cyclic shifts. For example, all possible ZC preamble sequences for PRACH resource set-1 may be obtained, e.g., by cyclically shifting Root-1 ZC sequence. For example, the set $\{A_i\}$, i=1,2,3 may denote the set of all preamble sequences for PRACH resource set-i, respectively. For example, a (e.g. one) ZC sequence may be selected (e.g. at random) from each of the sets $\{A_i\}$, i=1,2,3 independently. A transmitted preamble sequence may be a concatenation of a ZC sequence selected from each of the sets $\{A_i\}$.

For example, a preamble ZC sequence that may be selected from a PRACH resource set-i may be transmitted with a power scaling of $w_i$ ($0 \le w_i \le 1$), such that $\Sigma_i w_i = 1$. A reduced power may be used per PRACH resource set (e.g. to control interference) while spreading the total power across all PRACH resource sets. UAV RACH preambles may be decoded. In some embodiments, an eNB may perform concatenated preamble sequence decoding as a series of independent decodings of every PRACH resource that it may have used.

An eNB may perform a concatenated sequence detection for UAVs. An eNB may need to know (e.g. implicitly) whether to decode all PRACH resource sets or stop decoding upon decoding a resource set. Dedicated root sequences may be for UAVs, for example, to permit an eNB to distinguish whether a decoded preamble sequence in a PRACH resource was transmitted by a UAV or a terrestrial WTRU, e.g., given that an eNB may perform independent PRACH resource set decoding for both WTRUs and UAVs.

RACH preamble sequences may be jointly sent across PRACH resource sets, for example, using multiple (e.g. three) different modes. In some embodiments, e.g., for simplicity, let N denote a number of allowable preamble RACH sequences in each of multiple resource sets, e.g., set {$A_i$}(i=1,2,3). Allowable sequences may be constrained for a resource set to a subset of possible sequences of a root sequence, e.g., as opposed to considering all possible sequences for a root sequence.

A RACH collision probability metric may be minimized. For example, an independent sequence may be selected from each PRACH resource set. For example,p may denote a probability that any two users may use the same preamble sequence. The collision probability for the case where independent sequence may be selected from each of the PRACH resource set may be $p^3$. Absolute minimization of collision probability (e.g. by choosing independent sequences for each resource set) may be implemented without considering reliability.

Reliability of a sequence transmission may be maximized with a fixed collision probability. For example, the same preamble sequence may be transmitted across multiple (e.g. all) PRACH resource sets. The number of preamble sequences to choose from may be adaptable, for example, depending on a collision probability requirement (e.g. p). Repetition may be performed over frequency (e.g. as opposed to over time). Repetition in time may increase latency for UAVs, which may reduce command and control for UAV operation. Repetition over time may be implemented for a PRACH resource set or on a concatenated sequence using multiple PRACH resource sets.

There may be a tradeoff in minimizing the collision probability, and maximizing the sequence reliability. For example, the number of allowable preamble sequences in each PRACH resource may be set, for example, by assigning a unique index. This procedure may be performed for each PRACH resource set. A preamble sequence may be chosen at random independently from a first and second PRACH resource set. An index $i_1$, $i_2$ may be chosen independently from the first and second PRACH resource set, respectively.

A preamble sequence may be selected from a third PRACH resource set whose index may correspond to $i_3=i_1+i_2$. Sequences corresponding to indices $i_k$(k=1,2,3) may be weighted by a power scaling factor $w_k$(k=1,2,3) and transmitted through a resource set-k (k=1,2,3), respectively.

Redundant information may be sent in PRACH resource set-3 while independent sequences may be chosen for resource set-1 and resource set-2. It may be possible to recover a transmitted sequence, for example, even when a PRACH resource set decoding may fail. The collision probability (e.g. that any two WTRUs may use the same preamble sequences) may be $p^2$, for example, given that independent sequences may be chosen for two resource sets.

Consider a scenario in which "A" is the index of the ZC sequence that the aerial WTRU (UAV) uses in PRACH resource set-1, and "B" is the index of the ZC sequence that the aerial WTRU uses in PRACH resource set-2. Then the index of the ZC sequence that the aerial WTRU should use in PRACH resource set-3 should be A+B. Thus, the rule is that the index of the ZC sequence chosen by the UAV in PRACH resource set-3 should be the sum of index of the ZC sequences chosen in PRACH resource set-1 and PRACH resource set-2. More generally, the index of the sequence used in a resource set should be dependent on the index of the sequence used in other resource sets.

Table 2 compares performance of procedures that minimize collision probability, maximize sequence reliability and provide a tradeoff, respectively.

TABLE 2

| Scheme | Collision Probability | Error correction capability |
|---|---|---|
| Choosing independent sequences for all resource sets | $p^3$ | 0 |
| Repetition scheme | p | 2 |
| Coding across sequences | $p^2$ | 1 |

Unique root sequences may be used for UAVs, for example, so that an eNB may know whether to continue decoding all PRACH resource sets to identify a UAV (or low target SINR vehicles) or whether decoding PRACH resource sets may stop, e.g., after decoding a PRACH resource set that may identify a terrestrial WTRU. In some embodiments, UAVs (or low target SINR vehicles) may use the same root sequences as terrestrial WTRUs. A low target SINR vehicle may indicate (e.g. in every PRACH resource set) whether it is a UAV or not, for example, to notify an eNB. This indication may be performed, for example, through a separately defined PRACH indicator channel or by setting signaling bits (e.g. indicating a category of WTRU) in a PRACH resource set that indicates a UAV. An eNB aware that a category of a UAV (e.g. signaled in PRACH resource set) may decode all PRACH resource sets.

For example, root sequences used in 3GPP may be separated into subsets, with one subset for terrestrial WTRUs and another subset for low target SINR vehicles. The two subsets may not have common sequences. For example, let {$A_1$}, {$A_2$}, {$A_3$} be sets of orthogonal sequences that may be used by PRACH resource sets-1,2 and 3 respectively. Let {$A_1^r$}, {$A_2^r$}, {$A_3^r$} be sets of sequences that may be used by terrestrial WTRUs in PRACH resource set-1, 2 and 3, respectively. Sequences that may be used for PRACH resource sets-1,2 and 3 by the low target SINR vehicles may be: $\{(A_1^r)\}^c$, $\{(A_2^r)\}^c$, $\{(A_3^r)\}^c$, where $(.)^c$ may denote a complement of a set.

A longer ZC sequence may be provided. For example, M may denote the length of a ZC sequence (e.g. M=839 for preamble formats 0-3 ). A 3M length ZC sequence may be provided, for example, when three PRACH resource sets are used (e.g. as shown in FIG. 14). A 3M length sequence may be implemented, for example, so that a subset of the longer sequence (e.g. any length M part of the 3M long root sequence or cyclically shifted root sequence) may have a zero cross correlation and high autocorrelation with length M-sequences that may be used in 3GPP.

A concatenated ZC sequence may be used to transmit over an extended spectrum, for example, to improve RACH success probability for low target SINR WTRUs in a heterogeneous environment (e.g. where low target SINR WTRUs and target SINR WTRUs coexist as in air-ground scenarios). A UAV may receive UAV-specific root sequences that it may use for multiple PRACH resource sets via SIB2 or other signaling. A UAV may transmit a concatenated ZC sequence across an extended PRACH resource set, for example, so that a part of its ZC sequence transmitted in a resource set may be dependent on other independently chosen ZC sequences transmitted across other resource sets. An eNB may signal a scheme (e.g. Table 2) that a UAV may (e.g. should or must) use.

A UAV wireless/transmit receive unit determines one or more PRACH resource sets allocated for UAVs in a particular sub-frame, transmits a concatenated PRACH sequence comprising one or more PRACH sequences across multiple PRACH resource sets with reduced power spectral density, wherein each PRACH sequence transmitted over a resource set is based on a unique signaled root sequence. An eNB decodes the concatenated PRACH sequence as one or more per PRACH resource set decoding to infer uplink access Systems, methods, and instrumentalities have been disclosed for power control for aerial vehicles. Power control may be open loop. Power control may be managed based on altitude. Open loop power control may be based on, for example, path loss estimation from neighboring cells. Power control may be coordinated among interfering neighboring eNBs using path loss information. Dynamic power control may be WTRU-driven. Reference signal transmissions by an eNB may use uplink resources for path loss estimation. Interference estimation may be based on uplink reference signals jointly agreed by a group of eNB (multiple eNBs) that enables simultaneous uplink interference measurement (generated by UAVs) by those multiple eNBs. Path loss estimation may be based on downlink reference signals. Dynamic blanking may be provided for Cell-specific Reference Signals (CRS). Random access (e.g. RACH) may be provided for UAVs.

Features, elements and actions (e.g. processes and instrumentalities) are described by way of non-limiting examples. While examples may be directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein. The processes and instrumentalities described herein may apply in any combination, may apply to other wireless technologies, and for other services. A WTRU may refer to an identity of the physical device, or to the users identity such as subscription related identities, e.g., MSISDN, SIP URI, etc. WTRU may refer to application-based identities, e.g., user names that may be used per application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of providing open loop power control and modulation and coding scheme (MCS) selection for an aerial wireless transmit/receive unit (WTRU) in communication with a terrestrial-based wireless communication system that also communicates with terrestrial WTRUs, the method comprising:
    estimating a path loss for a serving cell along a first communication path between the serving cell and the aerial WTRU;
    estimating a path loss for a neighboring cell along a second communication path between the neighboring cell and the aerial WTRU, wherein the neighboring cell is different from the serving cell;
    determining a path loss compensation factor, wherein the path loss compensation factor is dependent on an altitude of the aerial WTRU, the path loss estimation for the serving cell, and the path loss estimation for the neighboring cell;
    dynamically selecting an MCS based on pre-configured rules for the determined path loss compensation factor; and
    controlling transmission power for the aerial WTRU by applying the path loss compensation factor and transmitting data based on the selected MCS.

2. The method of claim 1 wherein the path loss compensation factor is lower with higher altitude.

3. The method of claim 1 wherein estimating a path loss for the serving cell comprises using measurements of a reference signal power.

4. The method of claim 3 wherein the reference signal is a downlink reference signal.

5. The method of claim 1 further comprising dynamically blanking cell-specific reference signals (CRSs).

6. The method of claim 1 further comprising reporting, by the aerial WTRU to the serving cell, a cell-id of the neighboring cell and the path loss estimation for the neighboring cell.

7. The method of claim 6 further comprising reporting, by the serving cell to the neighboring cell, the path loss estimation for the neighboring cell.

8. The method of claim 7 further wherein the reporting by the serving cell comprises reporting through a backhaul connection.

9. The method of claim 1 wherein the power control is for a random access channel (RACH).

10. The method of claim 9 further comprising transmitting a concatenated Zadoff-Chu (ZC) sequence over the PRACH resource sets.

11. The method of claim 10 wherein the aerial WTRU transmits a unique ZC sequence from a pre-configured PRACH resource set for the aerial vehicles.

12. The method of claim 11 wherein the aerial WTRU concatenates the unique ZC sequence and transmits the unique ZC sequence across multiple PRACH resource sets.

13. The method of claim 12 wherein the aerial WTRU indicates that it is an aerial WTRU through a separately defined PRACH indicator channel or by setting signaling bits in a PRACH resource set.

14. The method of claim 10 wherein the aerial WTRU receives multiple ZC sequences that can be used to transmit in each of the PRACH resource sets, along with a rule for specifying an index of a sequence to be used in a resource set for transmitting the ZC sequence in each of the PRACH resource sets.

15. The method of claim 1 further comprising:
transmitting an indication of a rule in downlink control information (DCI) format to indicate an MCS index or resource blocks to use for determining a path loss compensation factor.

16. The method of claim 1 further comprising:
the aerial WTRU triggering a reporting event when at least one of:
the path loss to the serving cell,
the path loss to the neighboring cell, and
the path compensation factor meets a threshold.

17. The method of claim 1 further comprising the aerial WTRU reporting, to the neighboring cell, path loss information from the neighboring cell.

18. The method of claim 1 wherein the serving cell comprises an evolved Node B (eNB), the aerial WTRU comprises an unmanned aerial vehicle (UAV), and wherein the UAV comprises a drone.

19. A system comprising an aerial wireless/receive unit (WTRU), the aerial WTRU comprising:
a processor; and
a non-transitory computer-readable medium storing instructions that are operative, when executed by the processor, to cause the system to:
estimate a path loss for a serving cell along a first communication path between the serving cell and the aerial WTRU;
estimate a path loss for a neighboring cell along a second communication path between the neighboring cell and the aerial WTRU, wherein the neighboring cell is different from the serving cell;
determine a path loss compensation factor, wherein the path loss compensation factor is dependent on an altitude of the aerial WTRU, the path loss estimation for the serving cell, and the path loss estimation for the neighboring cell;
dynamically select a modulation and coding scheme (MCS) based on pre-configured rules for the determined path loss compensation factor; and
control transmission power for the aerial WTRU by applying the path loss compensation factor and transmitting data based on the selected MCS.

* * * * *